US011109388B2

(12) United States Patent
Wu et al.

(10) Patent No.: US 11,109,388 B2
(45) Date of Patent: Aug. 31, 2021

(54) METHOD AND DEVICE IN USER EQUIPMENT AND BASE STATION FOR WIRELESS COMMUNICATION

(71) Applicants: KeYing Wu, Shanghai (CN); XiaoBo Zhang, Shanghai (CN); Lin Yang, Shanghai (CN)

(72) Inventors: KeYing Wu, Shanghai (CN); XiaoBo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 98 days.

(21) Appl. No.: 16/654,017

(22) Filed: Oct. 16, 2019

(65) Prior Publication Data
US 2020/0120684 A1    Apr. 16, 2020

(30) Foreign Application Priority Data

Oct. 16, 2018 (CN) .......................... 201811199880.4

(51) Int. Cl.
  *H04W 72/08* (2009.01)
  *H04W 72/04* (2009.01)
  *H04W 24/08* (2009.01)

(52) U.S. Cl.
  CPC ......... *H04W 72/085* (2013.01); *H04W 24/08* (2013.01); *H04W 72/044* (2013.01)

(58) Field of Classification Search
  CPC ... H04W 72/08; H04W 72/085; H04W 72/10; H04W 72/044; H04W 72/0446; H04W 72/0453; H04W 24/08
  See application file for complete search history.

(56) References Cited

U.S. PATENT DOCUMENTS

| | | | | |
|---|---|---|---|---|
| 9,877,304 | B2* | 1/2018 | Li | H04W 72/0453 |
| 10,027,524 | B2* | 7/2018 | Kim | H04L 5/0048 |
| 10,470,203 | B2* | 11/2019 | Falahati | H04W 88/08 |
| 2003/0086366 | A1* | 5/2003 | Branlund | H04B 1/71052 370/208 |
| 2010/0035620 | A1* | 2/2010 | Naden | H04L 5/0041 455/450 |
| 2010/0215007 | A1* | 8/2010 | Zhang | H04L 1/0071 370/329 |

(Continued)

*Primary Examiner* — Kevin D Mew

(57) ABSTRACT

The disclosure discloses a method and device in a user equipment and a base station for wireless communication. The UE performs K channel listening in K sub-bands, respectively; determines that a first radio signal can only be transmitted in K1 sub-band(s) out the K sub-bands; and transmits the first radio signal in the K1 sub-band(s), wherein the K channel listening is used to determine the K1 sub-band(s) from the K sub-bands; the first radio signal comprises K1 first sub-signal(s) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1. The method not only ensures the reliability of uplink transmission but also avoids waste of resources in an NR-U system.

20 Claims, 23 Drawing Sheets

(56) References Cited

U.S. PATENT DOCUMENTS

| | | | |
|---|---|---|---|
| 2011/0019715 A1* | 1/2011 | Brisebois | H04W 72/005 375/130 |
| 2012/0051302 A1* | 3/2012 | Seki | H04B 7/022 370/329 |
| 2012/0108165 A1* | 5/2012 | Sawamoto | H04B 7/15535 455/11.1 |
| 2013/0343318 A1* | 12/2013 | Gruet | H04L 25/0224 370/329 |
| 2015/0280888 A1* | 10/2015 | Karsi | H04B 7/0413 370/329 |
| 2017/0245263 A1* | 8/2017 | Li | H04J 11/00 |
| 2018/0352578 A1* | 12/2018 | Zhang | H04B 17/309 |
| 2020/0119872 A1* | 4/2020 | Wu | H03M 13/13 |

\* cited by examiner $$\text{a number of REs occupied by the given first sub-signals in the time-frequency domain} = \min(\text{the given first-type value} \times \text{a number of bits included in the first bit block, the given first limit value})$$

FIG. 15

A first bit block | UCI |

FIG. 16

A first bit block | AUL-UCI |

FIG. 17

K1  —Used to determine→  K1 first offset(s)

FIG. 18

A given first-type value = A given first offset × A given first-type reference value

FIG. 19

METHOD AND DEVICE IN USER EQUIPMENT AND BASE STATION FOR WIRELESS COMMUNICATION

CROSS-REFERENCE TO RELATED APPLICATION

This application claims the priority benefit of Chinese Patent Application Serial Number 201811199880.4, filed on Oct. 16, 2018, the full disclosure of which is incorporated herein by reference.

BACKGROUND

Technical Field

The disclosure relates to a method and device in a wireless communication system, and in particular to a method and device in a wireless communication system that supports data transmission over unlicensed spectrum.

Related Art

The application scenarios of future wireless communication systems are increasingly diversified, and different application scenarios impose different performance requirements on the system. In order to meet the needs of various application scenarios, in the 3rd Generation Partner Project Radio Access Network (RAN) #75 plenary meeting, a research project for access to unlicensed spectrum under New Radio (NR) also passed. The 3GPP RAN #78 plenary meeting decided to support access to unlicensed spectrum in NR Release 15.

In the Long Term Evolution (LTE) License Assisted Access (LAA) project, a transmitter (a base station or a user equipment) needs to perform Listen Before Talk (LBT) before transmitting data on the unlicensed spectrum to ensure no interference with other ongoing wireless transmissions on the unlicensed spectrum. According to the discussion of the 3GPP RANI #92bis conference, in the NR-Unlicensed spectrum (NR-U) system, the LBT is in units of 20 MHz.

SUMMARY

The inventors found through research that in the NR-U system, the time-frequency resource(s) occupied by one uplink transmission is(are) not only limited by the resource allocation of the base station, but also is(are) affected by the LBT. The results of different LBTs will result in dynamic changes in available uplink time-frequency resources. Under the condition of dynamic changes in time-frequency resources, the problem that needs to be solved is how to avoid the waste of resources while ensuring the reliability of uplink transmission.

In view of the above problem, the disclosure discloses a solution. It should be noted that, in the case of no conflict, the embodiments in the user equipment of the disclosure and the features in the embodiments may be applied to the base station, and vice versa. In the case of no conflict, the embodiments of the disclosure and the features in the embodiments may be combined with each other arbitrarily.

The disclosure discloses a method in a user equipment for wireless communication, comprising:

performing K channel listening inK sub-bands, respectively;

determining that a first radio signal can only be transmitted in K1 sub-band(s) out of the K sub-bands; and transmitting the first radio signal in the K1 sub-band(s), wherein the K channel listening is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

In one embodiment, the problem to be solved by the disclosure is: how to ensure uplink transmission in the NR-U system, especially the transmission reliability of uplink control information while avoiding waste of resources in the case that a frequency domain resource that can be occupied by the uplink transmission dynamically changes with the result of the LBT. The above method allows a User Equipment (UE) to dynamically adjust a number(numbers) of REs occupied by a radio signal carrying uplink control information (i.e., the K1 first sub-signal(s)) in each of the available sub-bands according to a number of available sub-bands (i.e., the size of the K1) so as to solve this problem.

In one embodiment, the method is characterized in that the K1 first sub-signal(s) carry uplink control information, and the K1 sub-band(s) are sub-bands determined by the LBT to be used for transmitting a radio signal. The user equipment transmits a radio signal carrying uplink control information in each of the K1 sub-band(s), and adjusts a number(numbers) of REs occupied by the uplink control information in each of the K1 sub-band(s) according to the size of the K1.

In one embodiment, the above method has the advantage that a total number of REs occupied by the uplink control information in all available sub-bands is prevented from drastically changing with the change of the K1, not only ensuring the reliability of transmission of the uplink control information, but also avoiding waste of resources in the NR-U system.

In one embodiment, the above method has the advantage that the uplink control information is transmitted in each of available sub-bands, avoiding failure of receiving the uplink control information by the base station due to the misjudgment of the available sub-bands.

According to an aspect of the disclosure, K1 first-type value(s) is(are) used to determine a number(numbers) of REs occupied by the K1 first sub-signal(s) in the time-frequency domain, respectively, the K1 first-type value(s) is(are) linearly correlated with K1 first offset(s), respectively, and any one of the K1 first offset(s) is correlated with the K1.

According to an aspect of the disclosure, the K1 first-type value(s) and K1 first-type reference value(s) are in one-to-one correspondence, and any one of the K1 first-type value(s) is equal to a product of a corresponding first-type reference value and a corresponding first offset.

According to an aspect of the disclosure, the method comprises:

receiving first information, wherein the first information indicates M candidate offsets, any one of the K1 first offset(s) is one of the M candidate offsets, and the M is a positive integer greater than 1.

According to an aspect of the disclosure, a number of bits included in the first bit block is uncorrelated with the K1.

According to an aspect of the disclosure, the first radio signal comprises K1 second sub-signal(s), the K1 second sub-signal(s) is(are) transmitted in the K1 sub-band(s), respectively, each of the K1 second sub-signal(s) carries a second bit block, the second bit block comprises a positive integer number of bits, and the second bit block is used to determine the number of REs occupied by any one of the K1 first sub-signal(s) in the time-frequency domain.

In one embodiment, the above method has the advantage of reducing failure of receiving the first bit block by the base station due to the misjudgment of the K1.

According to an aspect of the disclosure, a number of REs occupied by any one of the K1 second sub-signal(s) in the time-frequency domain is uncorrelated with the K1.

In one embodiment, the above method has the advantage of reducing the receiving complexity of the base station.

In one embodiment, the above method has the advantage of avoiding failure of receiving the second bit block by the base station due to the misjudgment of the K1.

According to an aspect of the disclosure, the method comprises:
receiving second information,
wherein the second information is used to determine Q time windows, a time domain resource occupied by the first radio signal belongs to a first time window of the Q time windows, and the Q is a positive integer number greater than 1;

According to an aspect of the disclosure, the method comprises:
selecting the first time window from the Q time windows voluntarily, According to an aspect of the disclosure, the method comprises:
receiving a first signaling,
wherein the first signaling indicates a frequency domain resource occupied by the first radio signal.

The disclosure discloses a method in a base station for wireless communication, comprising:
monitoring a first radio signal in K sub-bands;
determining that the first radio signal only needs to be received in K1 sub-band(s) out of the K sub-bands;
receiving the first radio signal in the K1 sub-band(s);
wherein the monitoring behavior is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

According to an aspect of the disclosure, K1 first-type value(s) is(are) used to determine a number(numbers) of REs occupied by the K1 first sub-signal(s) in the time-frequency domain, respectively, the K1 first-type value(s) is(are) linearly correlated with K1 first offset(s), respectively, and any one of the K1 first offset(s) is correlated with the K1.

According to an aspect of the disclosure, the K1 first-type value(s) and K1 first-type reference value(s) are in one-to-one correspondence, and any one of the K1 first-type value(s) is equal to a product of a corresponding first-type reference value and a corresponding first offset.

According to an aspect of the disclosure, the method comprises:
transmitting first information,
wherein the first information indicates M candidate offsets, any one of the K1 first offset(s) is one of the M candidate offsets, and the M is a positive integer greater than 1.

According to an aspect of the disclosure, a number of bits included in the first bit block is uncorrelated with the K1.

According to an aspect of the disclosure, the first radio signal comprises K1 second sub-signal(s), the K1 second sub-signal(s) is(are) transmitted in the K1 sub-band(s), respectively, each of the K1 second sub-signal(s) carries a second bit block, the second bit block comprises a positive integer number of bits, and the second bit block is used to determine the number of REs occupied by any one of the K1 first sub-signal(s) in the time-frequency domain;

According to an aspect of the disclosure, a number of REs occupied by any one of the K1 second sub-signal(s) in the time-frequency domain is uncorrelated with the K1.

According to an aspect of the disclosure, the method comprises:
transmitting second information,
wherein the second information is used to determine Q time windows, a time domain resource occupied by the first radio signal belongs to a first time window of the Q time windows, and the Q is a positive integer number greater than 1.

According to an aspect of the disclosure, the monitoring behavior is used to determine the first time window from the Q time windows voluntarily.

According to an aspect of the disclosure, the method comprises:
transmitting a first signaling,
wherein the first signaling indicates a frequency domain resource occupied by the first radio signal.

The disclosure discloses a user equipment for wireless communication, comprising:
a first receiver performing K channel listening inK sub-bands, respectively;
a first processor determining that a first radio signal can only betransmitted in K1 sub-band(s) out of the K sub-bands; and
a first transmitter transmitting the first radio signal in the K1 sub-band(s),
wherein the K channel listening is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

The disclosure discloses a base station for wireless communication, comprising:
a second receiver monitoring a first radio signal in K sub-bands;
a second processor determining that the first radio signal only needs to be received in K1 sub-band(s) out of the K sub-bands;
a third receiver receiving the first radio signal in the K1 sub-band(s);
wherein the monitoring behavior is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

In one embodiment, the disclosure has the following advantages compared with the conventional solution.

In the NR-U system, when the available sub-band of the uplink transmission dynamically changes with the result of the LBT, the UE is allowed to dynamically adjust a number (numbers) of REs occupied by the uplink control information in each of available sub-bands according to a number of actually available sub-bands. A total number of REs occupied by the uplink control information in all available sub-bands is prevented from drastically changing with the change of a number of available sub-bands. This method not only ensures the reliability of transmission of the uplink control information, but also avoids waste of resources.

The radio signal carrying the uplink control information is transmitted in each of the actually occupied sub-bands, which improves the reliability of transmission of the uplink control information and avoids failure of receiving the uplink control information by the base station due to the misjudgment of the sub-bands actually occupied by the uplink transmission.

Bits indicating a number of REs occupied by the uplink control information in each sub-band are added in the uplink control information, and the bits are mapped to a fixed position of the PUSCH, reducing the receiving and decoding complexity of the base station, and reducing the probability of failure of receiving the uplink control information by the base station due to the misjudgment of the sub-bands actually occupied by the uplink transmission.

BRIEF DESCRIPTION OF THE DRAWINGS

Other features, objects and advantages of the disclosure will become more apparent from the detailed description of non-restrictive embodiments taken in conjunction with the following drawings.

FIG. 15 is a schematic diagram illustrating a number of REs occupied by a given first sub-signal of K1 first sub-signal(s) in a time-frequency domain according to one embodiment of the disclosure;

FIG. 16 is a schematic diagram illustrating a first bit block according to one embodiment of the disclosure;

FIG. 17 is a schematic diagram illustrating a first bit block according to one embodiment of the disclosure;

FIG. 18 is a schematic diagram illustrating K1 first offset(s) according to one embodiment of the disclosure;

FIG. 19 is a schematic diagram illustrating a given first-type values of K1 first-type value(s) according to one embodiment of the disclosure;

DESCRIPTION OF THE EMBODIMENTS

Embodiment 1

Figure 1:
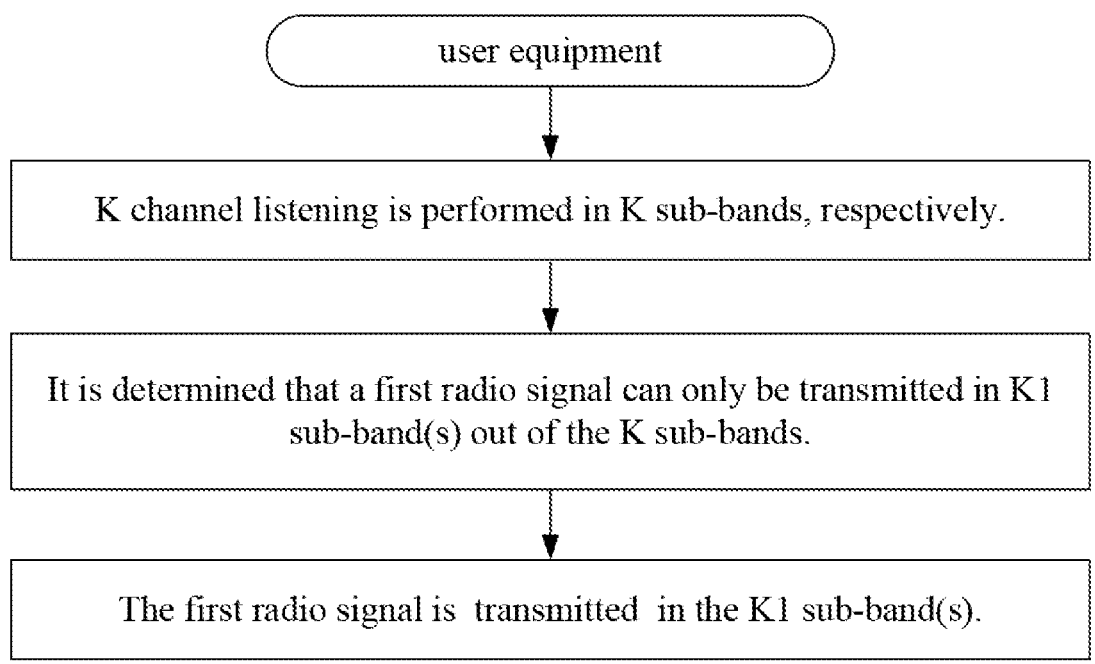
FIG. 1 is a flow diagram illustrating K channel listening and a first radio signal according to one embodiment of the disclosure.

Embodiment 1 illustrates a flow diagram of K channel listening and a first radio signal, shown in FIG. 1.

In Embodiment 1, the user equipment in the disclosure performs K channel listening inK sub-bands, respectively; determines that a first radio signal can only be transmitted in K1 sub-band(s) out of the K sub-bands; and transmits the first radio signal in the K1 sub-band(s). The K channel listening is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

In one embodiment, any one of the K channel listening is an LBT.

In one embodiment, the specific definition and implementation manner of the LBT is described in 3GPP TR36.889.

In one embodiment, any one of the K channel listening is Clear Channel Assessment (CCA).

In one embodiment, the specific definition and implementation of the CCA is described in 3GPP TR36.889.

In one embodiment, any one of the K channel listening is implemented in a manner defined in section 15 of 3GPP TS 36.213.

In one embodiment, the K channel listening is used to determine whether the K sub-bands are idle, respectively.

In one embodiment, the K channel listening is used to determine whether the K sub-bands can be used to transmit a radio signal, respectively.

In one embodiment, the K channel listening is used to determine whether the K sub-bands can be used by the user equipment to transmit a radio signal, respectively.

In one embodiment, the K channel listening is used to determine whether the K sub-bands can be used by the user equipment to transmit a radio signal in a time domain resource occupied by the first radio signal.

In one embodiment, the K channel listening is used to determine whether the K sub-bands can be used by the user equipment to transmit the first radio signal, respectively.

In one embodiment, any one of the K1 sub-band(s) is determined to be idle by the corresponding channel listening in the K channel listening.

In one embodiment, any one of the K1 sub-band(s) is determined by the corresponding channel listening in the K channel listening to be used to transmit a radio signal.

In one embodiment, any one of the K1 sub-band(s) is determined by the corresponding channel listening in the K channel listening to be used by the user equipment to transmit a radio signal.

In one embodiment, any one of the K1 sub-band(s) is determined by the corresponding channel listening in the K channel listening to be used by the user equipment to transmit a radio signal in the time domain resource(s) occupied by the user equipment.

In one embodiment, any one of the K1 sub-band(s) is determined by the corresponding channel listening in the K channel listening to be used by the user equipment to transmit the first radio signal.

In one embodiment, any one of the K sub-bands that does not belong to the K1 sub-band(s) is determined to be non-idle by the corresponding channel listening in the K channel listening.

In one embodiment, any one of the K sub-bands that does not belong to the K1 sub-band(s) is determined by the corresponding channel listening in the K channel listening to be unavailable for transmitting a radio signal.

In one embodiment, any one of the K sub-bands that does not belong to the K1 sub-band(s) is determined by the corresponding channel listening in the K channel listening to be unavailable for transmitting a radio signal by the user equipment.

In one embodiment, any one of the K sub-bands that does not belong to the K1 sub-band(s) is determined by the corresponding channel listening in the K channel listening to be unavailable for transmitting a radio signal by the user equipment in a time domain resource occupied by the first radio signal.

In one embodiment, any one of the K sub-bands that does not belong to the K1 sub-band(s) is determined by the corresponding channel listening in the K channel listening to be unavailable for transmitting the first radio signal by the user equipment.

In one embodiment, at least one of the K sub-bands that does not belong to the K1 sub-band(s) is determined to be idle by the corresponding channel listening in the K channel listening.

In one embodiment, at least one of the K sub-bands that does not belong to the K1 sub-band(s) is determined to be used to transmit a radio signal by the corresponding channel listening in the K channel listening.

In one embodiment, at least one of the K sub-bands that does not belong to the K1 sub-band(s) is determined by the corresponding channel listening in the K channel listening to be used by the user equipment to transmit a radio signal.

In one embodiment, at least one of the K sub-bands that does not belong to the K1 sub-band(s) is determined by the corresponding channel listening in the K channel listening to be used to transmit a radio signal by the user equipment in a time domain resource occupied by the first radio signal.

In one embodiment, the user equipment abandons transmitting the first radio signal in any one of the K sub-bands that does not belong to the K1 sub-band(s).

In one embodiment, the user equipment does not transmit a radio signal in any one of the K sub-bands that does not belong to the K1 sub-band(s) in a time domain resource occupied by the first radio signal.

In one embodiment, the first radio signal comprises uplink data.

In one embodiment, the first radio signal comprises an uplink reference signal.

In one sub-embodiment of the above embodiment, the uplink reference signal comprises DeModulation Reference Signals (DMRSs).

In one sub-embodiment of the above embodiment, the uplink reference signal comprises Phase Error Tracking Reference Signals (PTRSs).

In one embodiment, the first radio signal does not comprise an uplink reference signal.

In one sub-embodiment of the above embodiment, the uplink reference signal comprises DMRSs.

In one sub-embodiment of the above embodiment, the uplink reference signal comprises PTRSs.

In one embodiment, the first radio signal comprises Uplink Control Information (UCI).

In one embodiment, the first radio signal comprises Autonomous UpLink (AUL)-UCI.

In one embodiment, the first bit block carries uplink control information.

In one embodiment, the first bit block carries a UCI.

In one embodiment, the first bit block carries an AUL-UCI.

In one embodiment, the transmission of the first radio signal is an uplink transmission based on a configured grant.

In one embodiment, the transmission of the first radio signal is an uplink transmission based on the AUL.

In one embodiment, the time-frequency resource(s) occupied by the first radio signal belong(s) to the AUL resource(s).

In one embodiment, the time-frequency resource(s) occupied by the first radio signal belong(s) to the time-frequency resource(s) allocated to an uplink transmission based on a configured grant.

In one embodiment, each of the K1 first sub-signal(s) carries the first bit block, indicating that all the K1 first sub-signal(s) is(are) output after all or a part of bits in the first bit block are sequentially subjected to cyclic redundancy check (CRC) attachment, segmentation, encoding block-level CRC attachment, channel coding, rate matching, concatenation, scrambling, a modulation mapper, a layer mapper, a transform precoder, precoding, a resource element mapper, multicarrier symbol generation, modulation and upconversion.

In one embodiment, each of the K1 first sub-signal(s) carries the first bit block, indicating that all the K1 first sub-signal(s) is(are) output after all or a part of bits in the first bit block are sequentially subjected to CRC attachment, segmentation, encoding block-level CRC attachment, channel coding, rate matching, concatenation, scrambling, a modulation mapper, a layer mapper, precoding, a resource element mapper, multicarrier symbol generation, modulation and upconversion.

In one embodiment, each of the K1 first sub-signal(s) carries the first bit block, indicating that all the K1 first sub-signal(s) is(are) output after all or a part of bits in the first bit block are sequentially subjected to channel coding, rate matching, a modulation mapper, a layer mapper, a transform precoder, precoding, a resource element mapper, multicarrier symbol generation, modulation and upconversion.

In one embodiment, each of the K1 first sub-signal(s) carries the first bit block, indicating that all the K1 first sub-signal(s) is(are) output after all or a part of bits in the first bit block are sequentially subjected to channel coding, rate matching, a modulation mapper, a layer mapper, precoding, a resource element mapper, multicarrier symbol generation, modulation and upconversion.

In one embodiment, each of the K1 first sub-signal(s) carries the first bit block, indicating that the first bit block is used to generate each of the K1 first sub-signal(s).

In one embodiment, the user equipment repeatedly transmits the K1 first sub-signal(s) in the K1 sub-band(s), respectively.

In one embodiment, the RE refers to Resource Element(s).

In one embodiment, one RE occupies one multicarrier symbol in the time domain and one subcarrier in the frequency domain.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, a total number of REs occupied by the K1 first sub-signal(s) in the K1 sub-band(s) is uncorrelated with the K1.

In one embodiment, a number of REs occupied by any one of the K1 first sub-signal(s) in the time-frequency domain increases as the K1 decreases.

In one embodiment, for any given first sub-signal of the K1 first sub-signal(s), when the K1 is equal to A1, a number of REs occupied by the given first sub-signal in the time-frequency domain is equal to B1; when the K1 is equal to A2, a number of REs occupied by the given first sub-signal in the time-frequency domain is equal to B2; the A1, the A2, the B1 and the B2 are positive integers, respectively; the A1 is less than the A2, and the B1 is not less than the B2.

In one sub-embodiment of the above embodiment, the B1 is larger than the B2.

In one sub-embodiment of the above embodiment, the B1 is equal to the B2.

In one embodiment, a number of REs occupied by any one of the K1 first sub-signal(s) in the time-frequency domain is correlated with a total number of subcarriers occupied by the first radio signal in the K1 sub-band(s).

In one embodiment, a number of REs occupied by any one of the K1 first sub-signal(s) in the time-frequency domain increases as a total number of subcarriers occupied by the first radio signal in the K1 sub-band(s) decreases.

In one embodiment, for any given first sub-signal of the K1 first sub-signal(s), when a total number of subcarriers occupied by the first radio signal in the K1 sub-band(s) is equal to A3, a number of REs occupied by the given first sub-signal in the time-frequency domain is equal to B3; when a total number of subcarriers occupied by the first radio signal in the K1 sub-band(s) is equal to A4, a number of REs occupied by the given first sub-signal in the time-frequency domain is equal to B4; the A3, the A4, the B3 and the B4 are positive integers, respectively; the A3 is less than the A4, and the B3 is not less than the B4.

In one sub-embodiment of the above embodiment, the B3 is larger than the B4.

In one sub-embodiment of the above embodiment, the B3 is equal to the B4.

In one embodiment, a number of REs occupied by any one of the K1 first sub-signal(s) in the time-frequency domain is correlated with a total number of REs occupied by the first radio signal in the K1 sub-band(s).

In one embodiment, a number of REs occupied by any one of the K1 first sub-signal(s) in the time-frequency domain increases as a total number of REs occupied by the first radio signal in the K1 sub-band(s) decreases.

In one embodiment, for any given first sub-signal of the K1 first sub-signal(s), when a total number of REs occupied by the first radio signal in the K1 sub-band(s) is equal to A5, a number of REs occupied by the given first sub-signal in the time-frequency domain is equal to B5; when a total number of REs occupied by the first radio signal in the K1 sub-band(s) is equal to A6, a number of REs occupied by the given first sub-signal in the time-frequency domain is equal to B6; the A5, the A6, the B5 and the B6 are positive integers, respectively; the A5 is less than the A6, and the B5 is not less than the B6.

In one sub-embodiment of the above embodiment, the B5 is larger than the B6.

In one sub-embodiment of the above embodiment, the B5 is equal to the B6.

In one embodiment, the relationship between a number of REs occupied by any one of the K1 first sub-signal(s) in the time-frequency domain and the K1 is configured by a higher layer signaling.

In one embodiment, the relationship between a number of REs occupied by any one of the K1 first sub-signal(s) in the time-frequency domain and the K1 is configured by a Radio Resource Control (RRC) signaling.

In one embodiment, the relationship between a number of REs occupied by any one of the K1 first sub-signal(s) in the time-frequency domain and the K1 is configured by a physical layer signaling.

Embodiment 2

Figure 2:
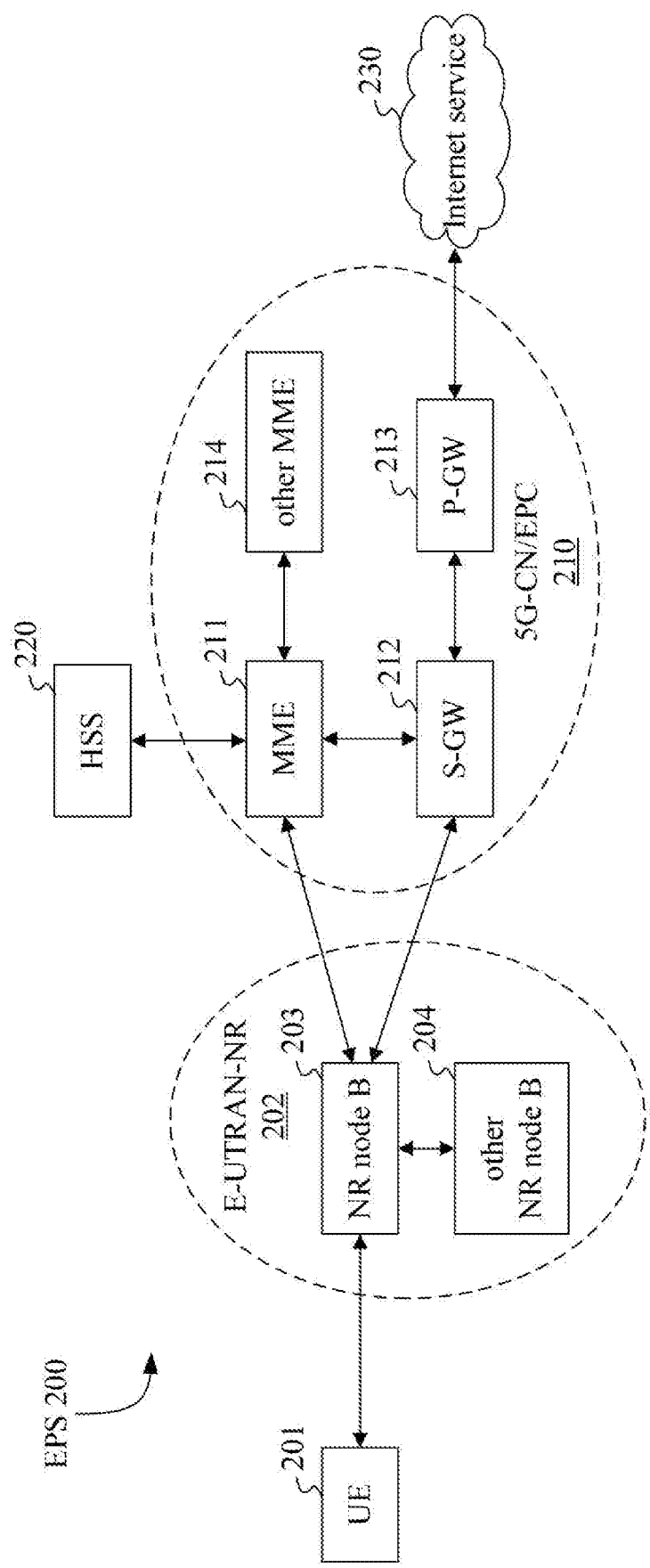
FIG. 2 is a schematic diagram illustrating a network architecture according to one embodiment of the disclosure.

Embodiment 2 illustrates a schematic diagram of a network architecture, as shown in FIG. 2.

FIG. 2 illustrates a network architecture 200 of Long-Term Evolution (LTE), Long-Term Evolution Advanced (LTE-A) and a future 5G system. The network architecture 200 of the LTE, LTE-A or 5G system may be referred to as an Evolved Packet System (EPS) 200. The EPS 200 may include one or more of a User Equipment (UE) 201, an Evolved UMTS Terrestrial Radio Access Network-New Radio (E-UTRAN-NR) 202, a 5G-CoreNetwork (5G-CN)/Evolved Packet Core (EPC) 210, a Home Subscriber Server (HSS) 220 and an Internet service 230. UMTS corresponds to the Universal Mobile Telecommunications System. The EPS 200 may be interconnected with other access networks. For simple description, the entities/interfaces are not shown. As shown in FIG. 2, the EPS 200 provides packet switching services. Those skilled in the art are easy to understand that various concepts presented throughout the present disclosure can be extended to networks providing circuit switching services. The E-UTRAN-NR 202 includes a New Radio (NR) node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides the UE 201 with an access point to the 5G-CN/EPC 210. Examples of UE 201 include cellular phones, smart phones, Session Initiation Protocol (SIP) phones, laptop computers, Personal Digital Assistants (PDAs), Satellite Radios, Global Positioning Systems, multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1 interface. The 5G-CN/EPC 210 comprises an MME 211, other MMES 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IMSs) and packet switching services.

In one embodiment, the gNB 203 corresponds to the base station in the disclosure.

In one embodiment, the UE 201 corresponds to the user equipment in the disclosure.

In one embodiment, the gNB 203 supports wireless communication for data transmission over an unlicensed spectrum.

In one embodiment, the UE 201 supports wireless communication for data transmission over an unlicensed spectrum.

Embodiment 3

Figure 3:
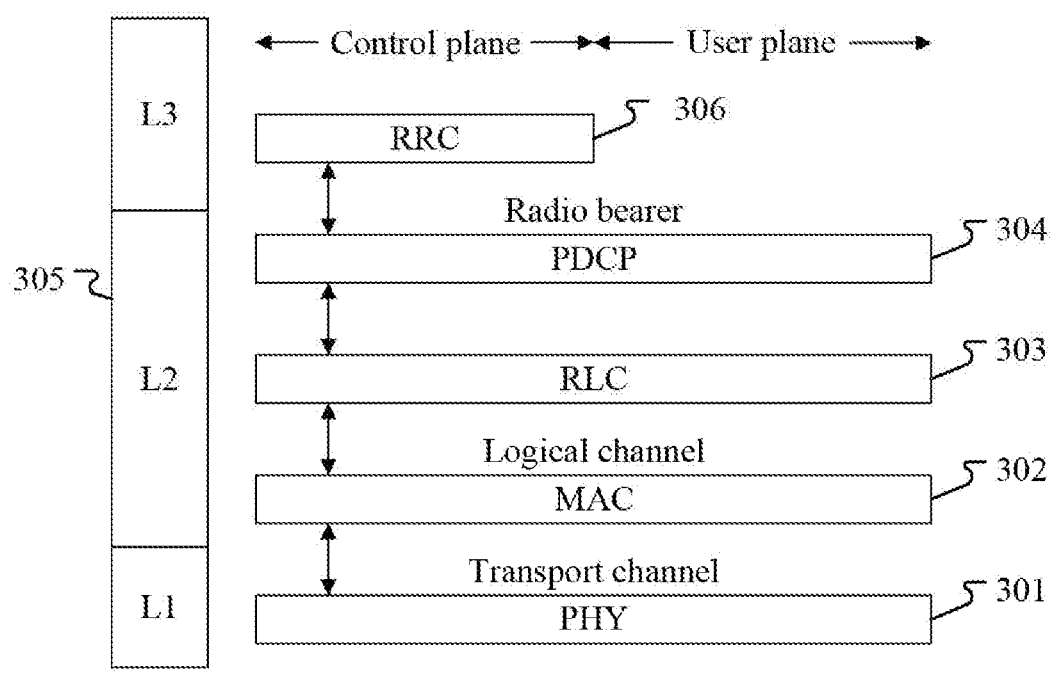
FIG. 3 is a schematic diagram illustrating a radio protocol architecture of a user plane and a control plane according to one embodiment of the disclosure

Embodiment 3 illustrates a schematic diagram of a radio protocol architecture of a user plane and a control plane, as shown in FIG. 3.

FIG. 3 illustrates a schematic diagram of a radio protocol architecture of a user plane and a control plane. In FIG. 3, the radio protocol architecture of a UE and gNB is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several protocol layers above the L2 305, such as a network layer (i.e. IP layer) terminated at a P-GW 213 of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARD). The MAC sublayer 302 provides multiplexing between logical channels and transmission channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first radio signal in the disclosure is generated by the PHY 301.

In one embodiment, the first bit block in the disclosure is generated by the PHY 301.

In one embodiment, the second bit block in the disclosure is generated by the PHY 301.

In one embodiment, the first information in the disclosure is generated by the RRC sublayer 306.

In one embodiment, the first information in the disclosure is generated by the MAC sublayer 302.

In one embodiment, the first information in the disclosure is generated by the PHY 301.

In one embodiment, the second information in the disclosure is generated by the RRC sublayer 306.

In one embodiment, the second information in the disclosure is generated by the MAC sublayer 302.

In one embodiment, the first signaling in the disclosure is generated by the PHY 301.

Embodiment 4

Figure 4:
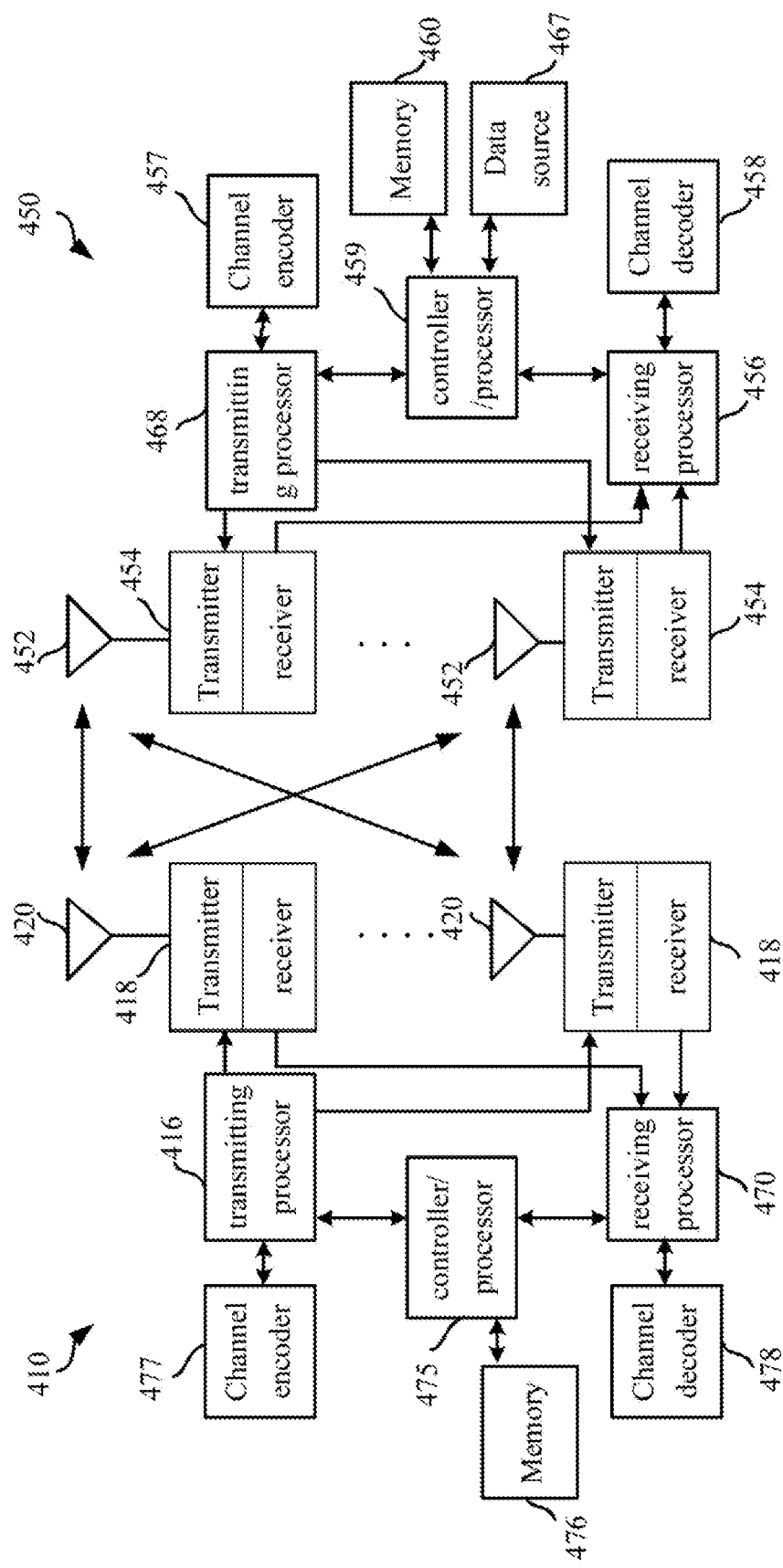
FIG. 4 is a schematic diagram illustrating an New Radio (NR) node and a UE according to one embodiment of the disclosure.

Embodiment 4 illustrates a schematic diagram of an NR node and a UE, as shown in FIG. 4. FIG. 4 is a block diagram of a UE 450 and a gNB 410 that communicate with each other in an access network.

The gNB 410 comprises a controller/processor 475, a memory 476, a receiving processor 470, a transmitting processor 416, a channel encoder 477, a channel decoder 478, a transmitter/receiver 418, and an antenna 420.

The UE 450 comprises a controller/processor 459, a memory 460, a data source 467, a transmitting processor 468, a receiving processor 456, a channel encoder 457, a channel decoder 458, a transmitter/receiver 454, and an antenna 452.

In Downlink (DL), at the gNB, a higher layer data packet from the core network is provided to the controller/processor 475. The controller/processor 475 implements the functionality of the L2 layer. In DL, the controller/processor 475 provides header compression, encryption, packet segmentation and reordering, multiplexing between logical and transmission channels, and allocation of radio resources of the UE 450 based on various priority metrics. The controller/processor 475 is also responsible for HARQ operations, retransmission of lost packets, and signaling to the UE 450. The transmitting processor 416 and the channel encoder 477 implement various signal processing functions for the L1 layer (i.e., the physical layer). The channel encoder 477 implements encoding and interleaving to facilitate forward error correction (FEC) at the UE 450. The transmitting processor 416 implements mapping of signal clusters based on various modulation schemes (such as binary phase shift keying (BPSK), quadrature phase shift keying (QPSK), M phase shift keying (M-PSK), M quadrature amplitude modulation (M-QAM)), and performs spatial precoding/beamforming processing on the encoded and modulated symbols to generate one or more spatial streams. The transmitting processor 416 then maps each spatial stream to subcarriers, multiplexes with reference signals (e.g., pilots) in the time and/or frequency domain, and then generates the physical channel carrying a time domain multicarrier symbol stream using an Inverse Fast Fourier Transform (IFFT). Each transmitter 418 converts the baseband multicarrier symbol stream provided by the transmitting processor 416 into a radio frequency stream, which is then provided to a different antenna 420.

In Downlink (DL), at the UE 450, each receiver 454 receives a signal through its respective antenna 452. Each receiver 454 recovers the information modulated onto the radio frequency carrier and converts the radio frequency stream into a baseband multicarrier symbol stream to be provided to the receiving processor 456. The receiving processor 456 and the channel decoder 458 implement various signal processing functions of the L1 layer. The receiving processor 456 converts the baseband multicarrier symbol stream from the time domain to the frequency domain using a Fast Fourier Transform (FFT). In the frequency domain, the physical layer data signal and the reference signal are demultiplexed by the receiving processor 456, wherein the reference signal is to be used for channel estimation, and the physical layer data is recovered out of a spatial stream with the UE 450 as the destination in the receiving processor 456 by multi-antenna detection. The symbol on each spatial stream is demodulated and recovered in receiving processor 456 and generates a soft decision. The channel decoder 458 then decodes and deinterleaves the soft decision to recover the higher layer data and the control signal transmitted by the gNB 410 on the physical channel. The higher layer data and the control signal are then provided to the controller/processor 459. The controller/processor 459 implements the functions of the L2 layer. The controller/processor can be associated with a memory 460 in which program codes and data are stored. The memory 460 can be referred to as a computer readable medium. In the DL, the controller/processor 459 provides demultiplexing between the transmission and logical channels, packet reassembly, decryption, header decompression, and control signal processing to recover a higher layer packet from the core network. The higher layer packet is then provided to all protocol layers above the L2 layer. Various control signals can also be provided to L3 for L3 processing. The controller/processor 459 is also responsible for error detection using an acknowledgement (ACK) and/or negative acknowledgement (NACK) protocol to support HARQ operations.

In Uplink (UL), at the UE 450, the data source 467 is used to provide the higher layer data packet to the controller/processor 459. The data source 467 represents all protocol layers above the L2 layer. Similar to the transmitting function at the gNB 410 described in the DL, the controller/processor 459 implements header compression, encryption, packet segmentation and reordering, and multiplexing between logical and transmission channels based on the radio resource allocation of the gNB 410, and implements L2 layer functions for the user plane and the control plane. The controller/processor 459 is also responsible for HARQ operations, retransmission of lost packets, and signaling to the gNB 410. The channel encoder 457 implements channel encoding. The encoded data is subjected to the modulation and multi-antenna spatial precoding/beamforming processing implemented by the transmitting processor 468, is modulated into a multicarrier/single-carrier symbol stream, and then is provided to different antennas 452 via the transmitter 454. Each transmitter 454 first converts the baseband symbol stream provided by the transmitting processor 468 into a radio frequency symbol stream and provides it to the antenna 452.

In Uplink (UL), the function at the gNB 410 is similar to the receiving function at the UE 450 described in DL. Each receiver 418 receives a radio frequency signal through its respective antenna 420, converts the received radio frequency signal into a baseband signal, and provides the baseband signal to the receiving processor 470. The receiving processor 470 and the channel decoder 478 collectively implement the function of the L1 layer. The controller/processor 475 implements the function of the L2 layer. The controller/processor 475 can be associated with a memory 476 in which program codes and data are stored. The memory 476 can be referred to as a computer readable medium. In UL, the controller/processor 475 provides demultiplexing between the transmission and logical channels, packet reassembly, decryption, header decompression, and control signal processing to recover a higher layer packet from the core network. The higher layer packet from the controller/processor 475 can be provided to the core network. The controller/processor 475 is also responsible for error detection using an ACK and/or NACK protocol to support HARQ operations.

In one embodiment, the UE 450 comprises: at least one processor and at least one memory, wherein the at least one memory includes a computer program code; the at least one memory and the computer program code are configured to be used together with the at least one processor. The UE 450 device at least: performs K channel listening in the disclosure in the K sub-bands in the disclosure, respectively; determines that the first radio signal in the disclosure can only be transmitted in K1 sub-band(s) out of the K sub-bands; and transmits the first radio signal in the K1 sub-band(s), wherein the K channel listening is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

In one embodiment, the UE 450 comprises: a memory in which a computer-readable instruction program is stored, wherein the computer-readable instruction program generates an action when executed by at least one processor. The action includes: performing K channel listening in the disclosure in the K sub-bands in the disclosure, respectively; determining that the first radio signal in the disclosure can only be transmitted in K1 sub-band(s) out of the K sub-bands; and transmitting the first radio signal in the K1 sub-band(s), wherein the K channel listening is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

In one embodiment, the gNB 410 comprises: at least one processor and at least one memory, wherein the at least one memory includes a computer program code; the at least one memory and the computer program code are configured to be used together with the at least one processor. The gNB 410 device at least: monitors the first radio signal in the disclosure in the K sub-bands in the disclosure; determines that only the first radio signal needs to be received in K1 sub-band(s) out of the K sub-bands; receives the first radio signal in the K1 sub-band(s); wherein the monitoring behavior is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

In one embodiment, the gNB 410 comprises: a memory in which a computer-readable instruction program is stored, wherein the computer-readable instruction program generates an action when executed by at least one processor. The action includes: monitoring the first radio signal in the disclosure in the K sub-bands in the disclosure; determining that only the first radio signal needs to be received in K1 sub-band(s) out of the K sub-bands; receiving the first radio signal in the K1 sub-band(s); wherein the monitoring behavior is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

In one embodiment, the gNB 410 corresponds to the base station in the disclosure.

In one embodiment, the UE 450 corresponds to the user equipment in the disclosure.

In one embodiment, at least one of {the antenna 452, the receiver 454, the receiving processor 456} is used to perform K channel listening in the disclosure in the K sub-bands in the disclosure, respectively.

In one embodiment, at least one of {the antenna 420, the receiver 418, the receiving processor 470, the channel decoder 478} is used to monitor the first radio signal in the disclosure in the K sub-bands in the disclosure, respectively.

In one embodiment, at least one of {the antenna 452, the receiver 454, the receiving processor 456} is used to determine that the first radio signal in the disclosure can only be transmitted in the K1 sub-band(s) out of the K sub-bands in the disclosure.

In one embodiment, at least one of {the antenna 420, the receiver 418, the receiving processor 470, the channel decoder 478} is used to determine that only the first radio signal in the disclosure needs to be received in the K1 sub-band(s) out of the K sub-bands in the disclosure.

In one embodiment, at least one of {the antenna 452, the transmitter 454, the transmitting processor 468, the channel encoder 457, the controller/processor 459, the memory 460, the data source 467} is used to transmit the first radio signal in the disclosure in the K1 sub-band(s) in the disclosure; at least one of {the antenna 420, the receiver 418, the receiving processor 470, the channel decoder 478, the controller/processor 475, the memory 476} is used to receive the first radio signal in the disclosure in the K1 sub-band(s) in the disclosure.

In one embodiment, at least one of {the antenna 420, the transmitter 418, the transmitting processor 416, the channel encoder 477, the controller/processor 475, the memory 476} is used to transmit the first information in the disclosure; at least one of {the antenna 452, the receiver 454, the receiving processor 456, the channel decoder 458, the controller/processor 459, the memory 460, the data source 467} is used to receive the first information in the disclosure.

In one embodiment, at least one of {the antenna 420, the transmitter 418, the transmitting processor 416, the channel encoder 477, the controller/processor 475, the memory 476} is used to transmit the second information in the disclosure; at least one of {the antenna 452, the receiver 454, the receiving processor 456, the channel decoder 458, the controller/processor 459, the memory 460, the data source 467} is used to receive the second information in the disclosure.

In one embodiment, at least one of {the antenna 420, the transmitter 418, the transmitting processor 416, the channel encoder 477, the controller/processor 475, the memory 476} is used to transmit the first signaling in the disclosure; at least one of {the antenna 452, the receiver 454, the receiving processor 456, the channel decoder 458, the controller/processor 459, the memory 460, the data source 467} is used to receive the first signaling in the disclosure.

In one embodiment, at least one of {the antenna 452, the receiver 454, the receiving processor 456} is used to select the first time window in the disclosure from the Q time windows in the disclosure voluntarily.

Embodiment 5

Figure 5:
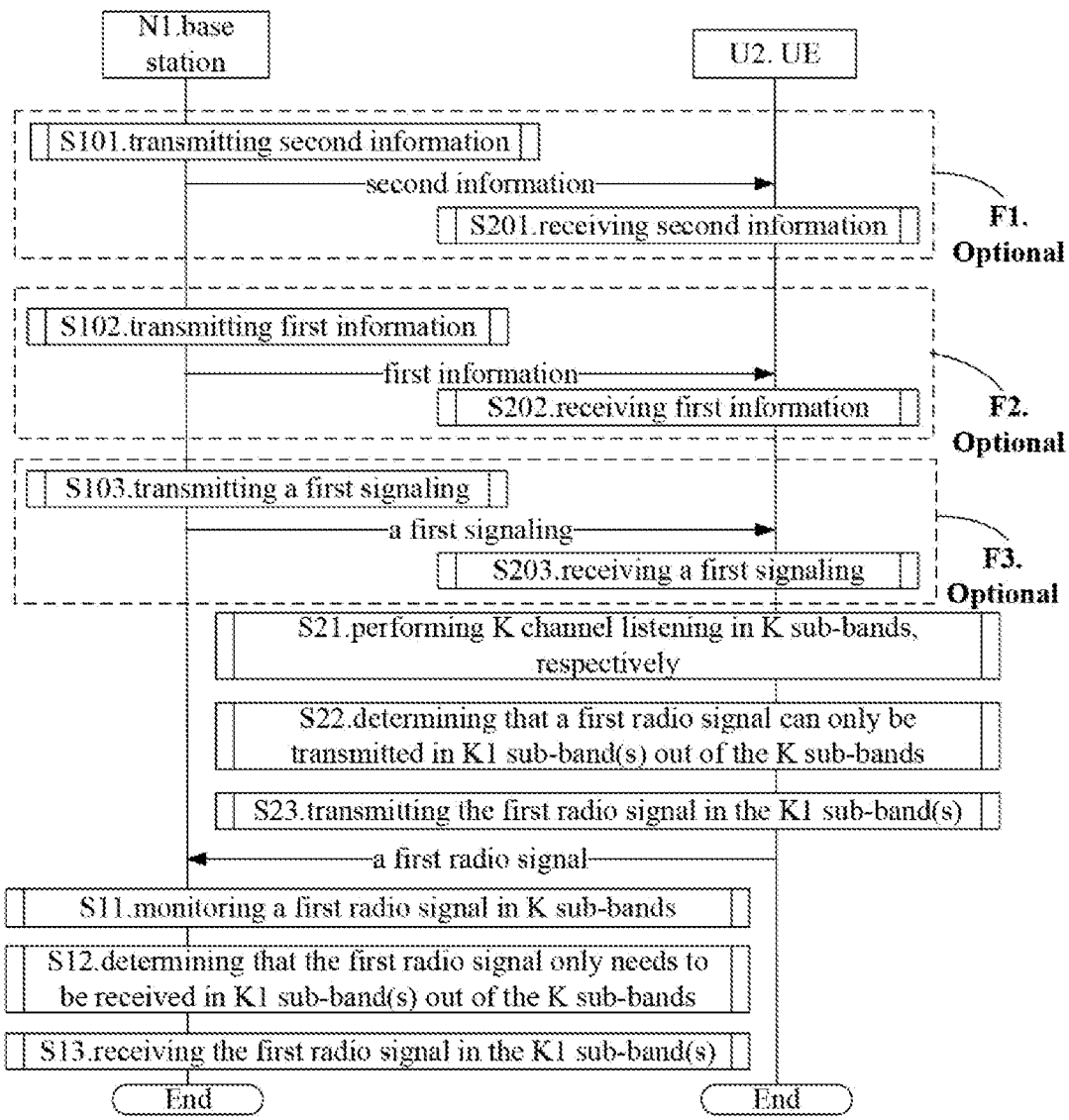
FIG. 5 is a flow diagram illustrating transmission according to one embodiment of the disclosure.

Embodiment 5 illustrates a flow diagram of wireless transmission, as shown in FIG. 5. In FIG. 5, the base station N1 is a maintenance base station of a serving cell of a user equipment U2. In FIG. 5, the steps in blocks F1 through F3 are optional, respectively.

The N1 transmits second information in step S101; transmits the first information in step S102; transmits the first signaling in step S103; monitors the first radio signal in the K sub-bands in step S11, respectively; determines that only the first radio signal needs to be received in K1 sub-band(s) out of the K sub-bands in step S12; and receives the first radio signal in the K1 sub-band(s) in step S13.

The U2 receives second information in step S201; receives the first information in step S202; receives the first signaling in step S203; performs K channel listening inK sub-bands, respectively in step S21; determines that a first radio signal can only be transmitted in K1 sub-band(s) out of the K sub-bands in step S22; and transmits the first radio signal in the K1 sub-band(s) in step S23.

In Embodiment 5, the K channel listening is used by the U2 to determine the K1 sub-band(s) from the K sub-bands, and the monitoring behavior is used by the N1 to determine the K1 sub-band(s) from the K sub-bands. The first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K. K1 first-type value(s) is(are) used to determine a number of REs occupied by the K1 first sub-signal(s) in the time-frequency domain, respectively, and the K1 first-type value(s) is(are) linearly correlated with K1 first offsets, respectively. The first information indicates M candidate offsets, any one of the K1 first offsets is one of the M candidate offsets, and the M is a positive integer greater than 1. The second information is used to determine Q time windows, a time domain resource occupied by the first radio signal belongs to a first time window of the Q time windows, and the Q is a positive integer number greater than 1. The first signaling indicates a frequency domain resource occupied by the first radio signal.

In one embodiment, the monitoring refers to energy detection, that is, sensing the energy of the radio signal in each of the K sub-bands and averaging the energy in time to obtain the received energy. If the received energy is greater than a first given threshold in any one of the K sub-bands, it is determined that the first radio signal needs to be received in the given sub-band; otherwise, it is determined that the first radio signal does not need to be received in the given sub-band.

In one embodiment, the monitoring refers to coherent detection, that is, performing coherent reception in each of the K sub-bands, and measuring the energy of the signal obtained after the coherent reception. If the energy of the signal obtained after the coherent reception is greater than a second given threshold in any one of the K sub-bands, it is determined that the first radio signal needs to be received in the given sub-band; otherwise, it is determined that the first radio signal does not need to be received in the given sub-band.

In one embodiment, the monitoring refers to blind detection, that is, receiving signals in each of the K sub-bands and performing a decoding operation. If it is determined that the decoding is correct according to the check bit in any one of the K sub-bands, it is determined that the first radio signal needs to be received in the given sub-band; otherwise, it is determined that the first radio signal does not need to be received in the given sub-band.

In one embodiment, the monitoring behavior is used to determine that the first radio signal is transmitted in the K1 sub-band(s).

In one embodiment, the monitoring behavior is used to determine that the first radio signal is transmitted in a portion of the K1 sub-band(s).

In one embodiment, the monitoring behavior is used to determine that the first radio signal is transmitted in all of the K1 sub-band(s).

In one embodiment, any one of the K1 first offsets is correlated with the K1.

In one embodiment, the K1 first-type value(s) and K1 first-type reference value(s) are in one-to-one correspondence, and any one of the K1 first-type value(s) is equal to a product of a corresponding first-type reference value and a corresponding first offset.

In one embodiment, a number of bits included in the first bit block is uncorrelated with the K1.

In one embodiment, the first radio signal comprises K1 second sub-signals, the K1 second sub-signals are transmitted in the K1 sub-band(s), respectively, each of the K1 second sub-signals carries a second bit block, the second bit block comprises a positive integer number of bits, and the second bit block is used to determine the number of REs occupied by any one of the K1 first sub-signal(s) in the time-frequency domain.

In one embodiment, the monitoring behavior and the second bit block are used together to determine the K1 sub-band(s) from the K sub-bands.

In one embodiment, a number of REs occupied by any one of the K1 second sub-signals in the time-frequency domain is uncorrelated with the K1.

In one embodiment, the first radio signal is transmitted on an uplink physical layer data channel (i.e., an uplink channel that can be used to carry physical layer data).

In one embodiment, the uplink physical layer data channel is a Physical Uplink Shared CHannel (PUSCH).

In one embodiment, the uplink physical layer data channel is a short PUSCH (sPUSCH).

In one embodiment, the uplink physical layer data channel is a New Radio PUSCH (NR-PUSCH).

In one embodiment, the uplink physical layer data channel is a Narrow Band PUSCH (NB-PUSCH).

In one embodiment, the first information is transmitted on a downlink physical layer data channel (i.e., a downlink channel that can be used to carry physical layer data).

In one embodiment, the downlink physical layer data channel is a Physical Downlink Shared CHannel (PDSCH).

In one embodiment, the downlink physical layer data channel is a short PDSCH (sPDSCH).

In one embodiment, the downlink physical layer data channel is a New Radio PDSCH (NR-PDSCH).

In one embodiment, the downlink physical layer data channel is a Narrow Band PDSCH (NB-PDSCH).

In one embodiment, the M candidate offsets are divided into K1 candidate offset group(s); the K1 first offset(s) form one candidate offset in the K1 candidate offset group(s), respectively. The first information comprises K1 first sub-information, and the K1 first sub-information indicates the K1 candidate offset group(s), respectively. The K1 first sub-information is transmitted on K1 downlink physical layer data channel(s) (i.e., a downlink channel that can be used to carry physical layer data).

In one sub-embodiment of the above embodiment, the K1 downlink physical layer data channel(s) is(are) PDSCH, respectively.

In one sub-embodiment of the above embodiment, the K1 downlink physical layer data channel(s) is(are) sPDSCH, respectively.

In one sub-embodiment of the above embodiment, the K1 downlink physical layer data channel(s) is(are) NR-PDSCH, respectively.

In one sub-embodiment of the above embodiment, the K1 downlink physical layer data channel(s) is(are) NB-PDSCH, respectively.

In one embodiment, the second information is transmitted on a downlink physical layer data channel (i.e., a downlink channel that can be used to carry physical layer data).

In one embodiment, the first signaling is transmitted on a downlink physical layer control channel (i.e., a downlink channel that can only be used to carry physical layer signaling).

In one embodiment, the downlink physical layer control channel is a Physical Downlink Control Channel (PDCCH).

In one embodiment, the downlink physical layer control channel is a short PDCCH (sPDCCH).

In one embodiment, the downlink physical layer control channel is a New Radio PDCCH (NR-PDCCH).

In one embodiment, the downlink physical layer control channel is a Narrow Band PDCCH (NB-PDCCH).

Embodiment 6

Figure 6:
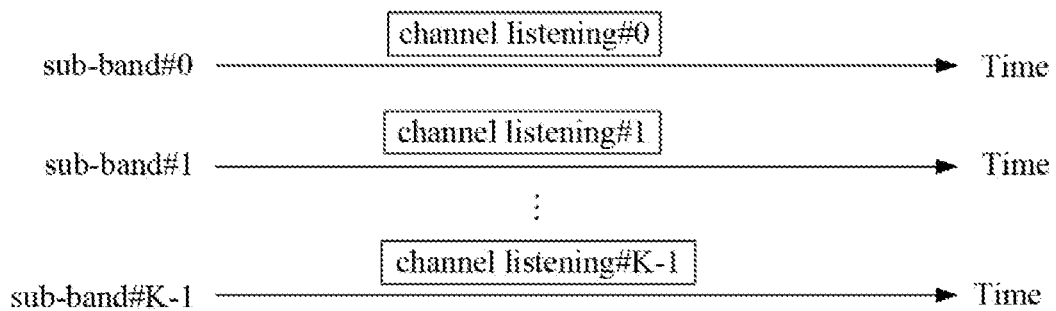
FIG. 6 is a schematic diagram illustrating K channel listening according to one embodiment of the disclosure.

Embodiment 6 illustrates a schematic diagram of K channel listening; as shown in FIG. 6.

In Embodiment 6, the K channel listening is performed in the K sub-bands in the disclosure, respectively. The K channel listening is used to determine whether the K sub-bands can be used to transmit a radio signal, respectively. The K1 channel listening in the K channel listening is used to determine that the K1 sub-band(s) in the disclosure can be used to transmit a radio signal, respectively, and the K1 channel listening is performed in the K1 sub-band(s), respectively. The execution of the K channel listening is uncorrelated with each other. In FIG. 6, the indices of the K sub-bands and the K channel listening are {#0, #1, . . . , #K-1}, respectively.

In one embodiment, any one of the K channel listening is an LBT.

In one embodiment, any one of the K channel listening is Clear Channel Assessment (CCA).

In one embodiment, the specific definition and implementation of the CCA is described in 3GPP TR36.889.

In one embodiment, any one of the K channel listening is implemented in a manner defined in section 15 of 3GPP TS 36.213.

In one embodiment, any one of the K channel listening is an Uplink Channel access procedure.

In one embodiment, a detailed description of the uplink channel access procedure is provided in section 15.2 of 3GPP TS 36.213.

In one embodiment, any one of the K channel listening is a Category 4 LBT.

In one embodiment, at least one of the K channel listening is a Category 4 LBT.

In one embodiment, any one of the K channel listening is a Category 2 LBT.

In one embodiment, at least one of the K channel listening is a Category 2 LBT.

In one embodiment, the specific definition and implementation of Category 4 LBT is provided in 3GPP TR36.889.

In one embodiment, the specific definition and implementation of the Category 2 LBT is provided in 3GPP TR 36.889.

In one embodiment, any one of the K channel listening is a sub-band LBT.

In one embodiment, any one of the K channel listening is an LBT that is executed on a frequency band of 20 MHz bandwidth.

In one embodiment, any one of the K channel listening is an LBT that is executed in units of 20 MHz bandwidth in the frequency domain.

In one embodiment, the end time of any two of the K channel listening is the same.

In one embodiment, the start time of at least two of the K channel listening is the same.

In one embodiment, the start time of at least two of the K channel listening is different.

In one embodiment, the counters N corresponding to any two of the K channel listening are independent from each other, and the specific definition of the counter N is as described in section 15.1.1 in 3GPP T S36.213 (V14.1.0).

In one embodiment, the counters N corresponding to at least two of the K channel listening are not equal to each other.

In one embodiment, when the user equipment in the disclosure stops transmitting in any one of the K sub-bands, for any given channel listening other than the channel listening corresponding to the given sub-band in the K channel listening, the user equipment continues to decrement the counter N corresponding to the given channel listening when an idle slot is detected after waiting for $4T_{s1}$ or reinitialising the counter N corresponding to the given channel listening.

In one embodiment, the end time of any one of the K channel listening is not later than the start time of a time domain resource occupied by the first radio signal in the disclosure.

Embodiment 7

Figure 7:
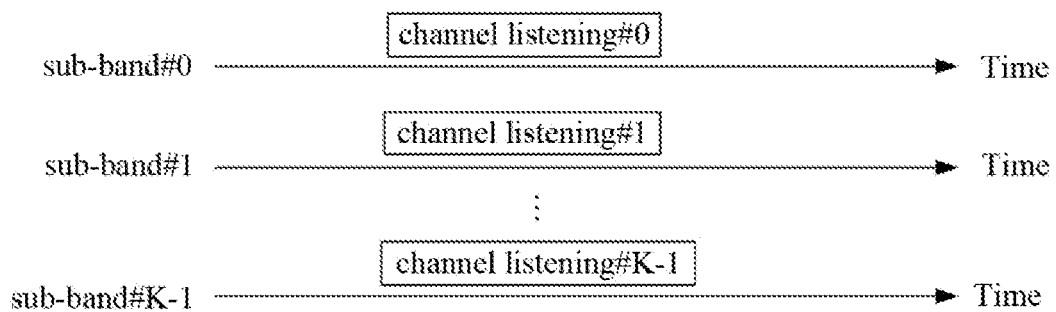
FIG. 7 is a schematic diagram illustrating K channel listening according to one embodiment of the disclosure.

Embodiment 7 illustrates a schematic diagram of K channel listening; as shown in FIG. 7.

In Embodiment 7, the execution of the K channel listening is independent from each other. The K channel listening corresponds to an equal counter N, and the specific definition of the counter N is described in section 15.1.1 of 3GPP TS 36.213 (V14.1.0). In FIG. 7, the indices of the K sub-bands and the K channel listening are {#0, #1, . . . , #K-1}, respectively.

In one embodiment, the counter N corresponding to all of the K channel listening is equal to a reference counter. The reference counter is the counter N corresponding to the channel listening corresponding to the sub-band having the maximum $CW_p$ in the K channel listening and the K sub-bands.

In one embodiment, the $CW_p$ is a size of a contention window, and the specific definition of the $CW_p$ is described in section 15 of 3GPP TS 36.213.

In one embodiment, when the user equipment in the disclosure stops transmitting in any given sub-band of the K sub-bands, the user equipment reinitialises the counter N corresponding to all of the K channel listening.

In one embodiment, the start time of any two of the K channel listening is the same.

In one embodiment, the K sub-bands have the same $CW_p$.

In one embodiment, every two of the $CW_p$ corresponding to the K sub-bands are independent from each other.

Embodiment 8

Figure 8:
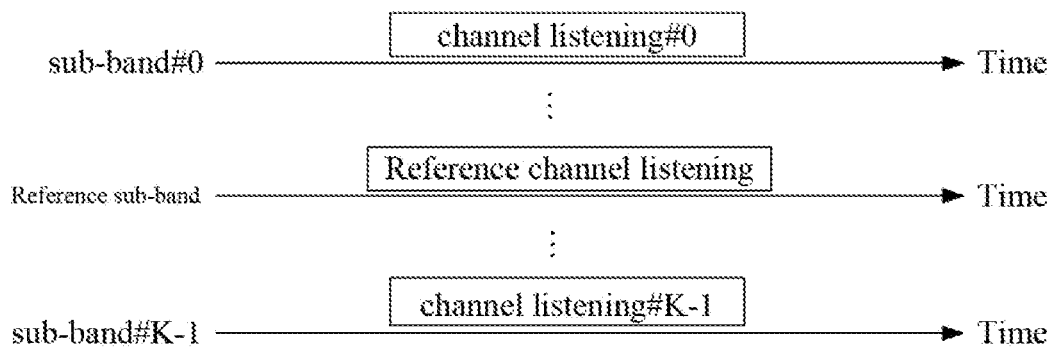
FIG. 8 is a schematic diagram illustrating K channel listening according to one embodiment of the disclosure.

Embodiment 8 illustrates a schematic diagram of K channel listening; as shown in FIG. 8.

In Embodiment 8, whether any one of the K sub-bands can be used for transmitting a radio signal is correlated with reference channel listening. The reference channel listening is the channel listening corresponding to the reference sub-band in the K channel listening, and the reference sub-band is one of the K sub-bands.

In one embodiment, only one of the K channel listening is a Category 4 LBT.

In one embodiment, at least one of the K channel listening is a Category 2 LBT.

In one embodiment, K-1 channel listening of the K channel listening is a Category 2 LBT.

In one embodiment, the reference channel listening is a Category 4 LBT.

In one embodiment, there is at least one given sub-band in the K sub-bands, and whether the given sub-band can be used for transmitting a radio signal is correlated with one of the K channel listening other than the channel listening corresponding to the given sub-band.

In one embodiment, any one of the K channel listening other than the reference channel listening is a Category 2 LBT.

In one embodiment, whether the reference sub-band can be used to transmit a radio signal is only correlated with the reference channel listening in the K channel listening.

In one embodiment, if the reference channel listening determines that the reference sub-band is idle, the reference sub-band can be used to transmit a radio signal; and if the reference channel listening determines that the reference sub-band is not idle, the reference sub-band cannot be used to transmit a radio signal.

In one embodiment, for any given sub-band of the K sub-bands other than the reference sub-band, the reference channel listening and the channel listening corresponding to the given sub-band are used together to determine whether the given sub-band can be used to transmit a radio signal.

In one embodiment, for any given sub-band of the K sub-bands other than the reference sub-band, if the reference channel listening determines that the reference sub-band is idle, and the channel listening corresponding to the given sub-band determines that the given sub-band is idle, the given sub-band can be used to transmit a radio signal.

In one embodiment, for any given sub-band of the K sub-bands other than the reference sub-band, if the reference channel listening determines that the reference sub-band is not idle, the given sub-band cannot be used to transmit a radio signal.

In one embodiment, for any given sub-band of the K sub-bands other than the reference sub-band, if the reference channel listening determines that the reference sub-band can be used to transmit a radio signal, and the channel listening corresponding to the given sub-band determines that the given sub-band is idle within 25 microseconds before the reference sub-band transmits a radio signal, the given sub-band can be used to transmit a radio signal.

In one embodiment, for any given sub-band of the K sub-bands other than the reference sub-band, if the channel listening corresponding to the given sub-band determines that the given sub-band is not idle, the given sub-band cannot be used to transmit a radio signal.

In one embodiment, for any given sub-band of the K sub-bands other than the reference sub-band, if the channel listening corresponding to the given sub-band determines that the given sub-band is not idle within 25 microseconds before the reference sub-band transmits a radio signal, the given sub-band is determined not to be used to transmit a radio signal.

In one embodiment, for any given sub-band of the K sub-bands other than the reference sub-band, the channel listening corresponding to the given sub-band and the reference channel listening end at the same time.

In one embodiment, the reference sub-band is randomly selected in the K sub-bands.

In one embodiment, the probability that any one of the K sub-bands is selected as the reference sub-band is equal.

In one embodiment, any one of the K sub-bands is not selected as the reference sub-band multiple times within 1 second.

Embodiment 9

Figure 9:
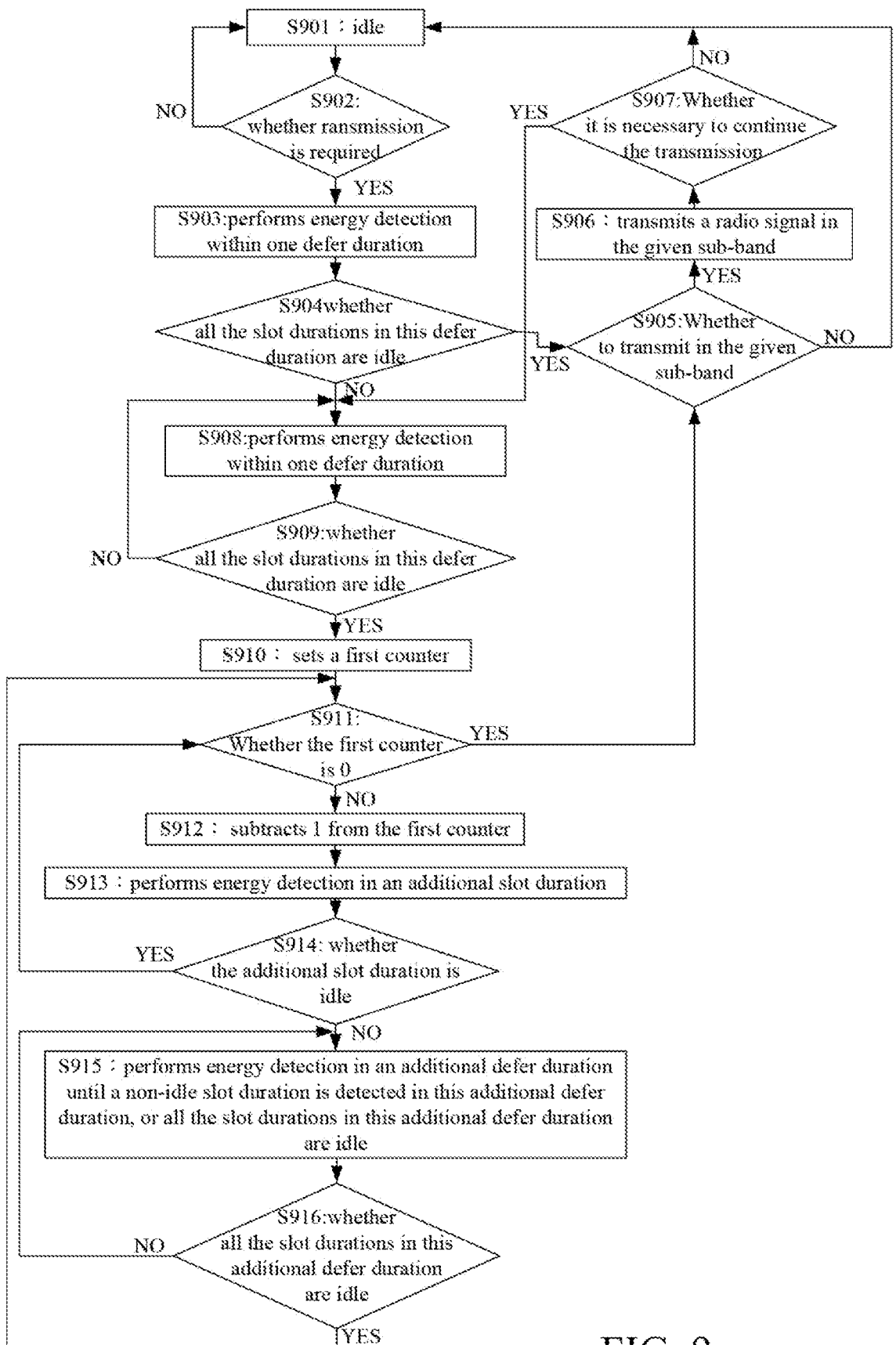
FIG. 9 is a flow diagram illustrating a given channel listening in K channel listening according to one embodiment of the disclosure.

Embodiment 9 illustrates a flow diagram of a given channel listening of K channel listening; as shown in FIG. 9.

In Embodiment 9, the given channel listening is one of the K channel listening, and the given channel listening is performed in a given sub-band of the K sub-bands in the disclosure. The process of the given channel listening can be described in the flow diagram in FIG. 9. The user equipment in the disclosure is in an idle state in step S901; determines in step S902 whether transmission is required; if transmission is required, proceeds to step S903, otherwise, returns to step S901; in step S903, performs energy detection within one defer duration in the given sub-band; in step S904, determines whether all the slot durations in this defer duration are idle, if all the slot durations in this defer duration are idle, proceeds to step S905, otherwise, proceeds to step S908; in step S905, determines whether to transmit in the given sub-band, if transmitting in the given sub-band, proceeds to step S906, otherwise, returns to step S901; in step S906, transmits a radio signal in the given sub-band; in step S907, determines whether it is necessary to continue the transmission, if it is necessary to continue the transmission, proceeds to step S908, otherwise, returns to step S901; in step 908, performs energy detection within one defer duration in the given sub-band; in step S909, determines whether all the slot durations in this defer duration are idle, if all the slot durations in this defer duration are idle, proceeds to step S910, otherwise, returns to step S908; in step S910 sets a first counter; in step S911, determines whether the first counter is 0, if the first counter is 0, returns to step S905, otherwise, proceeds to step S912; in step S912, subtracts 1 from the first counter; in step S913, performs energy detection in an additional slot duration in the given sub-band; in step S914, determines whether the additional slot duration is idle, if the additional slot duration is idle, returns to step S911, otherwise, proceeds to step S915; in step S915, performs energy detection in an additional defer duration in the given sub-band until a non-idle slot duration is detected in this additional defer duration, or all the slot durations in this additional defer duration are idle; in step S916, determines whether all the slot durations in this additional defer duration are idle, if all the slot durations in this additional defer duration are idle, returns to step S911; otherwise, returns to step S915.

In one embodiment, the specific definitions of the defer duration, the slot duration, the additional slot duration and the additional defer duration in FIG. 9 is described in section 15 of 3GPP TS 36.213.

In one embodiment, performing energy detection in a given duration indicates performing energy detection in all the slot durations within the given duration; the given duration is any of {all the defer durations in S903 and S908, all the additional slot durations in step S913, all the additional defer durations in step S915} in FIG. 9.

In one embodiment, performing energy detection in one slot duration indicates sensing the power of the radio signal in a given time unit and averaging it in time to obtain a received power; the given time unit is a duration within a slot duration.

In one embodiment, performing energy detection in one slot duration indicates sensing the energy of the radio signal in a given time unit and averaging it in time to obtain a received energy; the given time unit is a duration within a slot duration.

In one embodiment, one slot duration is idle, indicating sensing the power of the radio signal in a given time unit and averaging it in time, and the obtained received power is lower than a reference threshold; the given time unit is one duration of the one slot duration.

In one embodiment, one slot duration is idle, indicating sensing the energy of the radio signal in a given time unit and averaging it in time, and the obtained received power is lower than a reference threshold; the given time unit is one duration of the one slot duration.

In one embodiment, the duration of the given time unit is not shorter than 4 microseconds.

In one embodiment, the duration of a defer duration is 16 microseconds plus T1 9 microseconds, and the T1 is a positive integer.

In one sub-embodiment of the above embodiment, the T1 belongs to {1, 2, 3, 7}.

In one embodiment, a defer duration comprises a plurality of slot durations.

In one sub-embodiment of the above embodiment, the first slot duration and the second slot duration of the plurality of slot durations are non-consecutive.

In one sub-embodiment of the above embodiment, the time interval between the first slot duration and the second slot duration of the plurality of slot durations is 7 milliseconds.

In one embodiment, the duration of one defer duration is equal to the duration of an additional defer duration.

In one embodiment, the duration of one slot duration is 9 microseconds.

In one embodiment, the duration of an additional slot duration is equal to the duration of one slot duration.

In one embodiment, the value set by the first counter in step S910 is one of P candidate integers.

In one sub-embodiment of the above embodiment, the P belongs to {3, 7, 15, 31, 63, 127, 255, 511, 1023}.

In one sub-embodiment of the above embodiment, the P is $CW_p$ in the Category 4 LBT process.

In one sub-embodiment of the above embodiment, the P candidate integers are 0, 1, 2, . . . , P−1.

In one sub-embodiment of the above embodiment, the user equipment randomly selects a candidate integer among the P candidate integers as the value set by the first counter.

In one sub-embodiment of the above embodiment, the probability that any one of the P candidate integers is selected as the value set by the first counter is equal.

In one embodiment, the given channel sounding is any one of the K channel listening.

In one embodiment, the given channel listening is the reference channel listening in Embodiment 8.

Embodiment 10

Figure 10:
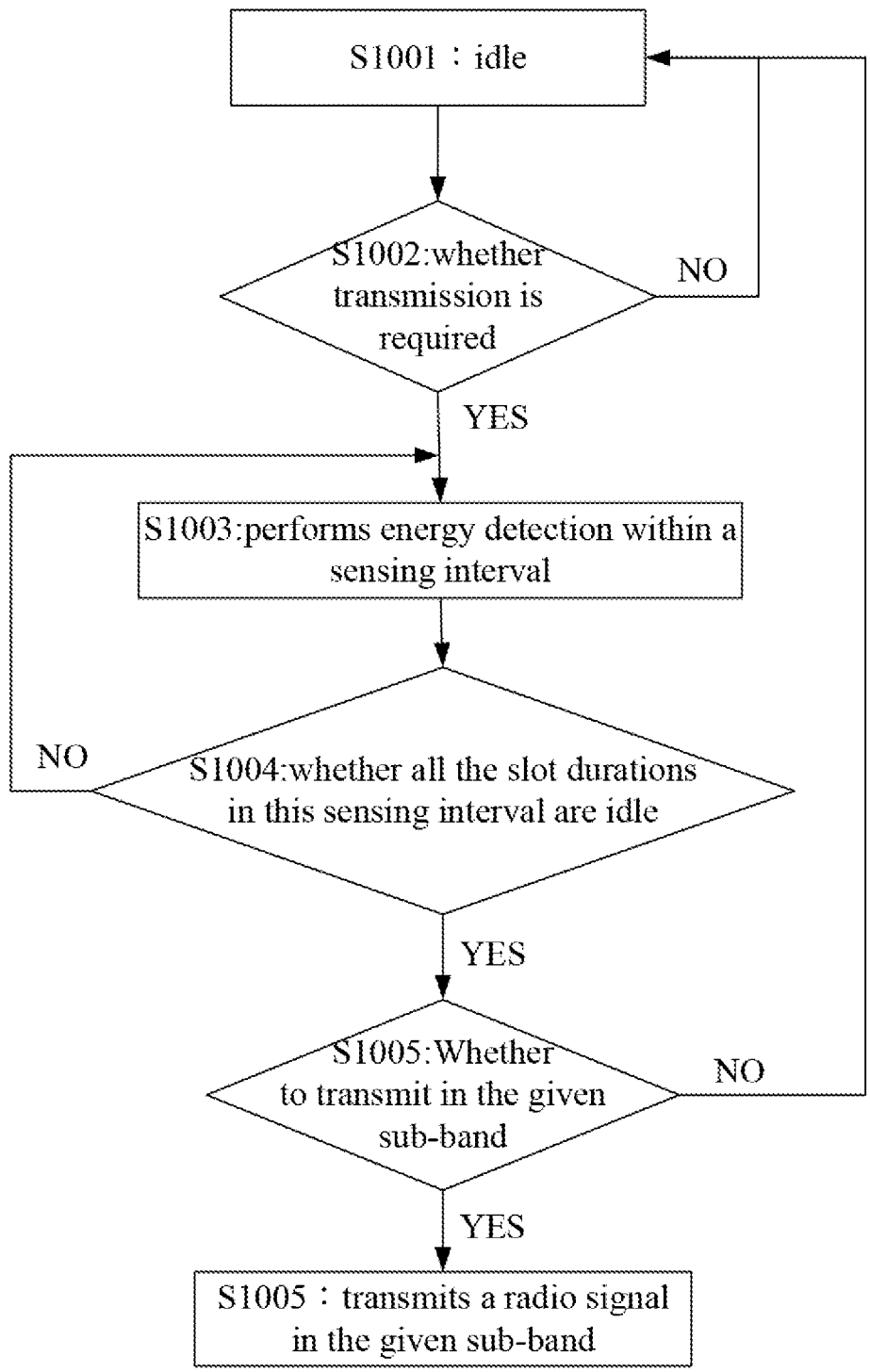
FIG. 10 is a flow diagram illustrating a given channel listening in K channel listening according to one embodiment of the disclosure.

Embodiment 10 illustrates a flow diagram of a given channel listening of the K channel listening; as shown in FIG. 10.

In Embodiment 10, the given channel listening is one of the K channel listening, and the given channel listening is performed in a given sub-band of the K sub-bands in the disclosure. The process of the given channel listening can be described in the flowchart in FIG. 10. The user equipment in the disclosure is in an idle state in step S1001, determines in step S1002 whether transmission is required; if transmission is required, proceeds to step S1003, otherwise, returns to step S1001; in step S1003, performs energy detection within a sensing interval in the given sub-band; in step S1004, determines whether all the slot durations in this sensing interval are idle, if all the slot durations in this sensing interval are idle, proceeds to step S1005, otherwise, proceeds to step S1003; in step S1005, transmits a radio signal in the given sub-band.

In one embodiment, the specific definitions of the sensing interval and slot duration in FIG. 10 are described in section 15.2 of 3GPP TS 36.213.

In one embodiment, performing energy detection in one sensing interval indicates performing energy detection in all the slot durations of the one sensing interval.

In one embodiment, the duration of a sensing interval is 25 microseconds.

In one embodiment, one sensing interval comprises two slot durations, and the two slot durations are non-consecutive in the time domain.

In one sub-embodiment of the above embodiment, the time interval in the two slot durations is 7 microseconds.

In one embodiment, the given channel sounding is any one of the K channel listening.

In one embodiment, the given channel listening is any one of the K channel listening other than the reference channel listening in Embodiment 8.

Embodiment 11

Figure 11:
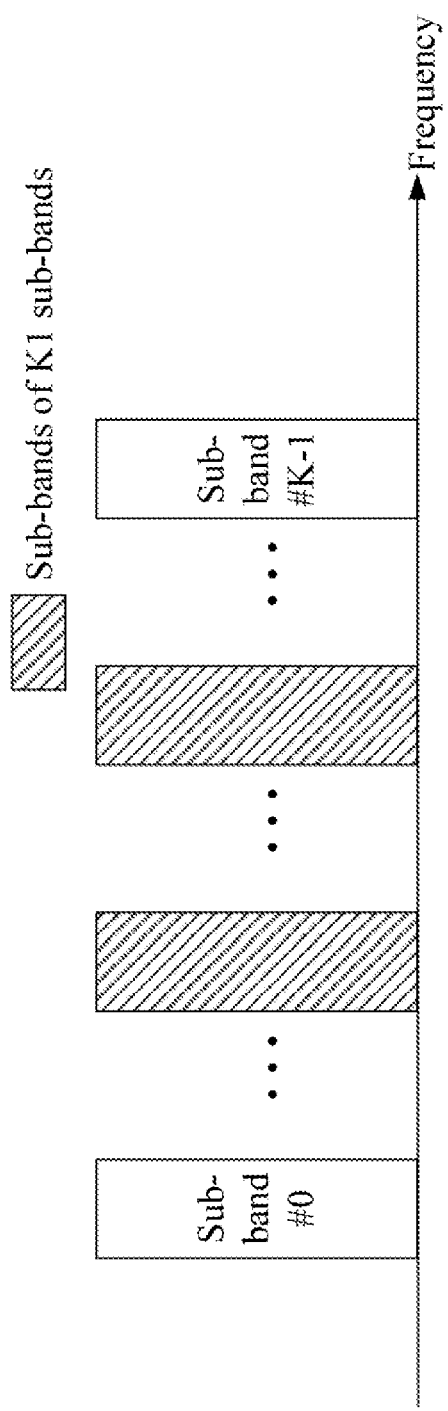
FIG. 11 is a schematic diagram illustrating resource mapping of K sub-bands and K1 sub-band(s) in a frequency domain according to one embodiment of the disclosure.

Embodiment 11 illustrates a schematic diagram of resource mapping of K sub-bands and K1 sub-band(s) in the frequency domain; as shown in FIG. 11.

In Embodiment 11, the user equipment in the disclosure performs the K channel listening in the disclosure in the K sub-bands, respectively, and determines that the first radio signal in the disclosure can only be transmitted in K1 sub-band(s) out of the K sub-bands. In FIG. 11, the indices of the K sub-bands are #{0, . . . , K-1}, respectively, and the box filled with left slashes represents sub-bands of the K1 sub-band(s).

In one embodiment, the K sub-bands are all deployed in an unlicensed spectrum.

In one embodiment, any one of the K sub-bands comprises one carrier.

In one embodiment, any one of the K sub-bands comprises a plurality of carriers.

In one embodiment, any one of the K sub-bands comprises one Bandwidth Part (BWP) in one carrier.

In one embodiment, any one of the K sub-bands comprises a plurality of BWPs in one carrier.

In one embodiment, the K sub-bands belong to the same carrier.

In one embodiment, the K sub-bands belong to the same BWP in one carrier.

In one embodiment, any one of the K sub-bands is a minimum frequency domain unit of the LBT.

In one embodiment, any one of the K sub-bands is a consecutive frequency domain interval.

In one embodiment, any one of the K sub-bands comprises a positive integer number of consecutive subcarriers in the frequency domain.

In one embodiment, any one of the K sub-bands comprises a positive integer number of consecutive Physical Resource Blocks (PRBs) in the frequency domain.

In one embodiment, any one of the K sub-bands comprises a positive integer number of consecutive Resource Blocks (RBs) in the frequency domain.

In one embodiment, any two of the K sub-bands are orthogonal (non-overlapping) in the frequency domain.

In one embodiment, the bandwidths of any two of the K sub-bands are equal.

In one embodiment, the bandwidths of at least two of the K sub-bands are not equal.

In one embodiment, the bandwidth of any one of the K sub-bands is 20 MHz.

In one embodiment, the K sub-bands are consecutive in the frequency domain.

In one embodiment, at least two adjacent sub-bands of the K sub-bands are non-consecutive in the frequency domain.

In one embodiment, a guard interval exists in the frequency domain between any two adjacent sub-bands of the K sub-bands.

In one embodiment, a given sub-band of the K sub-bands that does not belong to the K1 sub-band(s) is determined to be idle by the corresponding channel listening in the K channel listening, and the given sub-band and any one of the K1 sub-band(s) are non-consecutive in a frequency domain.

In one embodiment, a given sub-band of the K sub-bands that does not belong to the K1 sub-band(s) is determined to be idle by the corresponding channel in the K channel listening, and at least one of the K sub-bands is located between the given sub-band and the K1 sub-band(s) in the frequency domain and is determined to be non-idle by the corresponding channel listening in the K channel listening.

In one embodiment, the first radio signal occupies the same time domain resource in any two of the K1 sub-band(s).

In one embodiment, the positions of the K1 sub-band(s) in the K sub-bands are consecutive.

In one embodiment, the K1 sub-band(s) are consecutive in the frequency domain.

In one embodiment, the K1 is less than the K.

In one embodiment, the K1 is equal to the K.

Embodiment 12

Figure 12:
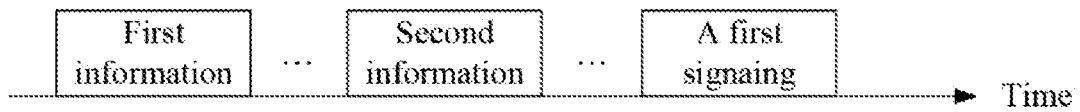
FIG. 12 is a schematic diagram illustrating a timing relationship between first information, second information, and a first signaling according to one embodiment of the disclosure.

Embodiment 12 illustrates a schematic diagram of the timing relationship between the first information, the second information, and the first signaling; as shown in FIG. 12.

In the embodiment 12, the end time of the time domain resource(s) occupied by the first information is not later than the start time of the time domain resource(s) occupied by the second information, and the end time of the time domain resource(s) occupied by the second information is not later than the start time of the time domain resource(s) occupied by the first signaling.

In one embodiment, the first information and the second information are carried by a different signaling.

In one embodiment, the first information and the second information are carried by a different higher layer signaling.

In one embodiment, the first information and the second information are carried by a different RRC signaling.

In one embodiment, the first information and the second information are transmitted on different downlink physical layer data channels.

Embodiment 13

Figure 13:
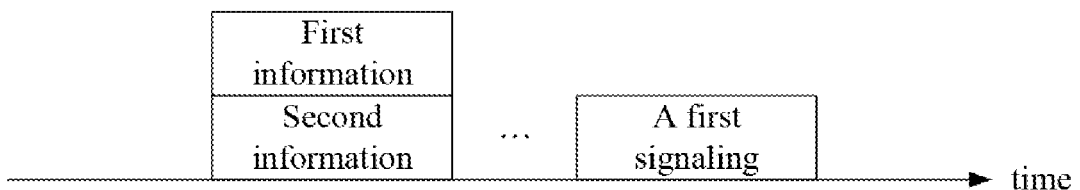
FIG. 13 is a schematic diagram illustrating a timing relationship between first information, second information, and a first signaling according to one embodiment of the disclosure.

Embodiment 13 illustrates a schematic diagram of the timing relationship between the first information, the second information, and the first signaling; as shown in FIG. 13.

In Embodiment 13, the first information and the second information occupy the same time domain resource, and the end time of the time domain resource(s) occupied by the first information and the second information is not later than the start time of the time domain resource(s) occupied by the first signaling.

In one embodiment, the first information and the second information are carried by the same signaling.

In one embodiment, the first information and the second information are carried by the same higher layer signaling.

In one embodiment, the first information and the second information are carried by the same RRC signaling.

In one embodiment, the first information and the second information are transmitted on the same downlink physical layer data channel.

Embodiment 14

Figure 14:
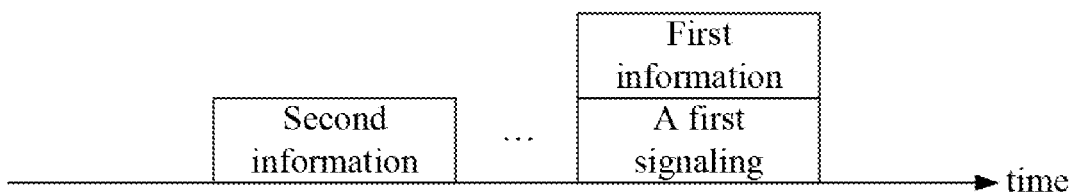
FIG. 14 is a schematic diagram illustrating a timing relationship between first information, second information, and a first signaling according to one embodiment of the disclosure.

Embodiment 14 illustrates a schematic diagram of the timing relationship between the first information, the second information, and the first signaling; as shown in FIG. 14.

In Embodiment 14, the first information and the first signaling occupy the same time domain resource, and the start time of the time domain resource(s) occupied by the first information and the first signaling is no later than the end time of the time domain resource(s) occupied by the second information.

In one embodiment, the first signaling carries the first information.

Embodiment 15

Embodiment 15 illustrates a schematic diagram of a number of REs occupied by a given first sub-signal of the K1 first sub-signal(s) in the time-frequency domain; as shown in FIG. 15.

In Embodiment 15, each of the K1 first sub-signal(s) carries the first bit block in the disclosure. The K1 first-type value(s) in the disclosure is(are) used to determine a number (numbers) of REs occupied by the K1 first sub-signal(s) in the time-frequency domain, respectively. The K1 first sub-signal(s) and the K1 first limit values are in one-to-one correspondence, respectively. The given first sub-signal is any one of the K1 first sub-signal(s). The number of REs occupied by the given first sub-signal in the time-frequency domain is equal to a product of the given first-type value and a number of bits included in the first bit-block and the minimum of the given first limit value; the given first-type value is a first-type value of the K1 first-type value(s) corresponding to the given first sub-signal, and the given first limit value is a first limit value of the K1 first limit value(s) corresponding to the given first sub-signal.

In one embodiment, any two of the K1 first sub-signal(s) have a same number of REs occupied in the time-frequency domain.

In one embodiment, at least two of the K1 first sub-signal(s) have a different number of REs occupied in the time-frequency domain.

In one embodiment, the K1 first limit value(s) is(are) correlated with a number of REs occupied by the first radio signal in the disclosure in the K1 sub-band(s), respectively.

In one embodiment, the K1 first limit value(s) is(are) all correlated with a total number of REs occupied by the first radio signal in the disclosure in the K1 sub-band(s).

In one embodiment, the first information in the disclosure indicates a relationship between a number of REs occupied by any one of the K1 first sub-signal(s) in the time-frequency domain and the K1.

In one embodiment, the second information in the disclosure indicates a relationship between a number of REs occupied by any one of the K1 first sub-signal(s) in the time-frequency domain and the K1.

In one embodiment, the first signaling in the disclosure indicates a relationship between a number of REs occupied by any one of the K1 first sub-signal(s) in the time-frequency domain and the K1.

In one embodiment, any two of the K1 first limit value(s) are equal.

In one embodiment, at least two of the K1 first limit value(s) are not equal.

In one embodiment, the given first limit value is $$\left[\alpha \sum\nolimits_{l=l_0}^{N_{symb,all}^{PUSCH}-1} M_{sc}^{UCI}(l)\right],$$

wherein the $\alpha$ is a scaling parameter configured by a higher layer signaling, the $l_0$ is an index of the first multicarrier symbol occupied by the PUSCH that does not comprise the DMRS, the $N_{symb,all}^{PUSCH}$ is a number of multicarrier symbols occupied by the PUSCH, and the $M_{sc}^{UCI}(l)$ is a number of REs that can be occupied by UCI on the l-th multicarrier symbol. The specific definitions of $$\left[\alpha \sum\nolimits_{l=l_0}^{N_{symb,all}^{PUSCH}-1} M_{sc}^{UCI}(l)\right],$$

the $\alpha$, the $l_0$, the $N_{symb,all}^{PUSCH}$ and the $M_{sc}^{UCI}(l)$ are described in section 6.3.2.4 of 3GPP TS 38.212.

In one embodiment, the given first limit value is $$\left[\alpha \sum\nolimits_{l=0}^{N_{symb,all}^{PUSCH}-1} M_{sc}^{UCI}(l) - Q'_{ACK}\right],$$

and the $Q'_{ACK}$ is a number of REs occupied by the HARQ-ACK. The specific definitions of $$\left[\alpha \sum\nolimits_{l=0}^{N_{symb,all}^{PUSCH}-1} M_{sc}^{UCI}(l) - Q'_{ACK}\right]$$

and the $Q'_{ACK}$ are described in section 6.3.2.4 of 3GPP TS 38.212.

In one embodiment, the given first limit value is $$\left[\sum\nolimits_{l=0}^{N_{symb,all}^{PUSCH}-1} M_{sc}^{UCI}(l) - Q'_{ACK}\right].$$

In one embodiment, the given first limit value is $$\left[\alpha \sum\nolimits_{l=0}^{N_{symb,all}^{PUSCH}-1} M_{sc}^{UCI}(l) - Q'_{ACK} - Q'_{CSI-1}\right],$$

and the $Q'_{CSI-1}$ is a number of REs occupied by the CSI part 1. The specific definitions of the $$\left[\alpha \sum\nolimits_{l=0}^{N_{symb,all}^{PUSCH}-1} M_{sc}^{UCI}(l) - Q'_{ACK} - Q'_{CSI-1}\right]$$

and the $Q'_{CSI-1}$ are described in section 6.3.2.4 of 3GPP TS38.212.

In one embodiment, the given first limit value is $$\left[\sum\nolimits_{l=0}^{N_{symb,all}^{PUSCH}-1} M_{sc}^{UCI}(l) - Q'_{ACK} - Q'_{CSI-1}\right].$$

In one embodiment, the given first restriction value is $M_{sc}^{PUSCH} \cdot N_{symb}^{PUSCH}$, the $M_{sc}^{PUSCH}$ is a bandwidth configured by a latest AUL activation DCI, and the $N_{symb}^{PUSCH}$ is a multicarrier symbol number allocated to the PUSCH. The specific definitions of the $M_{sc}^{PUSCH}$ and the $N_{symb}^{PUSCH}$ are described in section 5.2.2 of 3GPP TS 36.212.

Embodiment 16

Embodiment 16 illustrates a schematic diagram of a first bit block; as shown in FIG. 16.

In Embodiment 16, each of the K1 first sub-signal(s) in the disclosure carries a first bit block, and the first bit block carries a UCI.

In one embodiment, the first bit block carries Hybrid Automatic Repeat reQuest-Acknowledgement (HARQ-ACK).

In one embodiment, the first bit block carries a Scheduling Request (SR).

In one embodiment, the first bit block carries a Channel-State Information Reference Signal Resource Indicator (CRI).

In one embodiment, the first bit block carries Channel State Information (CSI).

In one sub-embodiment of the above embodiment, the CSI comprises one or more of a CRI, a Precoding Matrix Indicator (PMI), a Reference Signal Received Power (RSRP), a Reference Signal Received Quality (RSRQ) and a Channel Quality Indicator (CQI).

Embodiment 17

Embodiment 17 illustrates a schematic diagram of a first bit block; as shown in FIG. 17.

In Embodiment 17, each of the K1 first sub-signal(s) in the disclosure carries a first bit block, and the first bit block carries an AUL-UCI.

In one embodiment, the first bit block indicates a UE ID of the user equipment in the disclosure.

In one embodiment, the first bit block comprises a first sub-field, and the first sub-field in the first bit block indicates a UE ID of the user equipment in the disclosure.

In one sub-embodiment of the above embodiment, the first sub-field in the first bit block comprises all or part of the information in an AUL Cell (C)-Radio Network Temporary Identifier (RNTI) field.

In one sub-embodiment of the above embodiment, the first sub-field in the first bit block is an AUL C-RNTI field.

In one sub-embodiment of the above embodiment, the first sub-field in the first bit block is consisted of 16 bits.

In one embodiment, the specific definition of the AUL C-RNTI field is described in section 5.2.2.6A of 3GPP TS 36.212.

In one embodiment, the UE ID is a Cell (C)-RNTI.

In one embodiment, the first bit block indicates a HARQ process number corresponding to the first radio signal in the disclosure.

In one embodiment, the first bit block comprises a second sub-field, and the second sub-field in the first bit block indicates the HARQ process number corresponding to the first radio signal in the disclosure.

In one sub-embodiment of the above embodiment, the second sub-field in the first bit block comprises all or part of the information in the HARQ process number field.

In one sub-embodiment of the above embodiment, the second sub-field in the first bit block is the HARQ process number field.

In one sub-embodiment of the above embodiment, the second sub-field in the first bit block is consisted of 4 bits.

In one embodiment, the specific definition of the HARQ process number field is described in section 5.2.2.6A of 3GPP TS 36.212.

In one embodiment, the first bit block indicates a Redundancy Version (RV) corresponding to the first radio signal in the disclosure.

In one embodiment, the first bit block comprises a third sub-field, and the third sub-field in the first bit block indicates the RV corresponding to the first radio signal in the disclosure.

In one sub-embodiment of the above embodiment, the third sub-field in the first bit block comprises all or part of the information in a Redundancy version field.

In one sub-embodiment of the above embodiment, the third sub-field in the first bit block is a Redundancy version field.

In one sub-embodiment of the above embodiment, the third sub-field in the first bit block is consisted of 2 bits.

In one embodiment, the specific definition of the Redundancy version field is described in section 5.2.2.6A of 3GPP TS 36.212.

In one embodiment, the first bit block indicates a New Data Indicator (NDI) corresponding to the first radio signal in the disclosure.

In one embodiment, the first bit block comprises a fourth sub-field, and the fourth sub-field in the first bit block indicates an NDI corresponding to the first radio signal in the disclosure.

In one sub-embodiment of the above embodiment, the fourth sub-field in the first bit block comprises all or part of the information in a New data indicator field.

In one sub-embodiment of the above embodiment, the fourth sub-field in the first bit block is a New data indicator field.

In one sub-embodiment of the above embodiment, the fourth sub-field in the first bit block is consisted of 1 or 2 bits.

In one embodiment, the specific definition of the New data indicator field is described in section 5.2.2.6A of 3GPP TS 36.212.

In one embodiment, the first bit block indicates the start time of a time domain resource occupied by the first radio signal in the disclosure.

In one embodiment, the first bit block comprises a fifth sub-field, and the fifth sub-field in the first bit block indicates the start time of a time domain resource occupied by the first radio signal in the disclosure.

In one sub-embodiment of the above embodiment, the fifth sub-field in the first bit block comprises all or part of the information in a PUSCH starting symbol field.

In one sub-embodiment of the above embodiment, the fifth sub-field in the first bit block is a PUSCH starting symbol field.

In one sub-embodiment of the above embodiment, the fifth sub-field in the first bit block is consisted of one bit.

In one embodiment, the specific definition of the PUSCH starting symbol field is described in section 5.2.2.6A of 3GPP TS 36.212.

In one embodiment, the first bit block indicates the end time of a time domain resource occupied by the first radio signal in the disclosure.

In one embodiment, the first bit block comprises a sixth sub-field, and the sixth sub-field in the first bit block indicates the end time of a time domain resource occupied by the first radio signal in the disclosure.

In one sub-embodiment of the above embodiment, the sixth sub-field in the first bit block comprises all or part of the information in a PUSCH ending symbol field.

In one sub-embodiment of the above embodiment, the sixth sub-field in the first bit block is a PUSCH ending symbol field.

In one sub-embodiment of the above embodiment, the sixth sub-field in the first bit block is consisted of one bit.

In one embodiment, the specific definition of the PUSCH ending symbol field is described in section 5.2.2.6A of 3GPP TS 36.212.

In one embodiment, the first bit block carries a Channel Occupancy Time (COT) Sharing indication.

In one embodiment, the first bit block comprises a seventh sub-field, and the seventh sub-field in the first bit block comprises all or part of the information in a Channel Occupancy Time (COT) sharing indication field.

In one embodiment, the first bit block comprises a seventh sub-field, and the seventh sub-field in the first bit block is a Channel Occupancy Time (COT) sharing indication field.

In one sub-embodiment of the above embodiment, the seventh sub-field in the first bit block is consisted of one bit.

In one embodiment, the specific definition of the COT sharing indication field is described in section 5.2.2.6A of 3GPP TS 36.212.

In one embodiment, the first bit block comprises the first sub-field, the second sub-field, the third sub-field, the fourth sub-field, the fifth sub-field, the sixth sub-field and the seventh sub-field in Embodiment 17.

Embodiment 18

Embodiment 18 illustrates a schematic diagram of K1 first offset(s); as shown in FIG. 18.

In Embodiment 18, the K1 first-type value(s) in the disclosure is(are) used to determine a number(numbers) of REs occupied by the K1 first sub-signal(s) in the disclosure in the time-frequency domain, respectively, the K1 first-type value(s) is(are) linearly correlated with K1 first offset(s), respectively, and any one of the K1 first offset(s) is correlated with the K1.

In one embodiment, any one of the K1 first offset(s) is $\beta_{offset}^{AUL-UCI}$.

In one embodiment, at least one of the K1 first offset(s) is $\beta_{offset}^{AUL-UCI}$.

In one embodiment, the specific definition of the $\beta_{offset}^{AUL-UCI}$ is described in section 5.2 of 3GPP TS 36.212 (V15.3.0).

In one embodiment, any one of the K1 first offset(s) is one of $\beta_{offset}^{HARQ-ACK}$, $\beta_{offset}^{CSI-part1}$, and $\beta_{offset}^{CSI-part2}$.

In one embodiment, at least one of the K1 first offset(s) is one of $\beta_{offset}^{HARQ-ACK}$, $\beta_{offset}^{CSI-part1}$, and $\beta_{offset}^{CSI-part2}$.

In one embodiment, the specific definition of the $\beta_{offset}^{HARQ-ACK}$, and $\beta_{offset}^{CSI-part1}$, and the $\beta_{offset}^{CSI-part2}$ is described in section 6.3.2.4 of 3GPP TS38.212 (V15.2.0).

In one embodiment, any one of the K1 first offset(s) is a positive real number.

In one embodiment, any one of the K1 first offset(s) is a positive real number not less than one.

In one embodiment, any two of the K1 first offset(s) are equal.

In one embodiment, any two of the K1 first offset(s) are not equal.

In one embodiment, at least two of the first offsets of the K1 first offset(s) are not equal.

In one embodiment, at least two of the K1 first offset(s) are equal.

In one embodiment, any one of the K1 first offset(s) is correlated with the K1, indicating that the value of any one of the K1 first offset(s) is correlated with the K1.

In one embodiment, any one of the K1 first offset(s) is correlated with the K1, indicating that the size of any one of the K1 first offset(s) is correlated with the K1.

In one embodiment, any one of the K1 first offset(s) is correlated with the K1, indicating that the K1 is used to determine any one of the K1 first offset(s).

In one embodiment, any one of the K1 first offset(s) increases as the K1 decreases.

In one embodiment, for any given first offset of the K1 first offset(s), when the K1 is equal to A1, the given first offset is equal to C1; when the K1 is equal to A2, the given first offset is equal to C2; the A1 and the A2 are positive integers, respectively, and the C1 and the C2 are positive real numbers, respectively; the A1 is less than the A2, the C1 is not less than the C2.

In one sub-embodiment of the above embodiment, the C1 is greater than the C2.

In one sub-embodiment of the above embodiment, the C1 is equal to the C2.

In one embodiment, the relationship between any one of the K1 first offset(s) and the K1 is configured by a higher layer signaling.

In one embodiment, the relationship between any one of the K1 first offset(s) and the K1 is configured by an RRC signaling.

In one embodiment, the relationship between any one of the K1 first offset(s) and the K1 is configured by a physical layer signaling.

In one embodiment, the first information in the disclosure indicates the relationship between any one of the K1 first offset(s) and the K1.

In one embodiment, the second information in the disclosure indicates the relationship between any one of the K1 first offset(s) and the K1.

In one embodiment, the first signaling in the disclosure indicates the relationship between any one of the K1 first offset(s) and the K1.

Embodiment 19

Embodiment 19 illustrates a schematic diagram of a given first-type value in K1 first-type value(s); as shown in FIG. 19.

In Embodiment 19, the K1 first-type value(s) is(are) linearly correlated with K1 first offset(s) in the disclosure, respectively; the K1 first-type value(s) and K1 first-type reference value(s) in the disclosure are in one-to-one correspondence. The given first-type value is any one of the K1 first-type value(s), the given first-type value is equal to a product of a given first-type reference value and a given first offset; the given first-type reference value is a first-type reference value corresponding to the given first-type value in the K1 first-type reference value(s), and the given first offset is a first offset corresponding to the given first-type value in the K1 first offset(s).

In one embodiment, any two of the K1 first-type value(s) are equal.

In one embodiment, any two of the K1 first-type value(s) are not equal.

In one embodiment, at least two of the K1 first-type value(s) are not equal.

In one embodiment, at least two of the K1 first-type value(s) are equal.

In one embodiment, the first radio signal in the disclosure carries a third bit block, the third bit block comprises a Transport Block (TB); and the K1 first-type reference value(s) is(are) determined by a number of REs occupied by the first radio signal in the K1 sub-band(s) and a number of bits in the third bit block.

In one embodiment, the first radio signal in the disclosure carries a third bit block, the third bit block comprises a TB; and the K1 first-type reference value(s) are determined by a number of REs occupied by the first radio signal in the K1 sub-band(s) and a number of bits in the third bit block.

In one embodiment, each of the first radio signal and the second radio signal in the disclosure carries a third bit block, the third bit block comprises data; the second radio signal is first transmitted by the third bit block, the first radio signal is a retransmitted by the third bit block; and the K1 first-type reference value(s) are determined by a number of REs occupied by the second radio signal in the time-frequency domain and a number of bits in the third bit block.

In one embodiment, any two of the K1 first-type reference value(s) are equal.

In one embodiment, any two of the K1 first-type reference value(s) are not equal.

In one embodiment, at least two of the K1 first-type reference value(s) are not equal.

In one embodiment, at least two of the K1 first-type reference value(s) are equal.

In one embodiment, the given first-type reference value is equal to $$\frac{\sum_{l=0}^{N_{symb,all}^{PUSCH}-1} M_{sc}^{UCI}(l)}{\sum_{r=0}^{C_{UL-SCH}-1} K_r},$$

the $C_{UL-SCH}$ is a number of code blocks included in the PUSCH, the $K_r$ is a number of bits included in the r-th code block, the $N_{symb,all}^{PUSCH}$ is a number of multicarrier symbols occupied by the PUSCH, and the $M_{sc}^{UCI}(l)$ is a number of REs that can be occupied by UCI on the l-th multicarrier symbol. The specific definitions of the $$\frac{\sum_{l=0}^{N_{symb,all}^{PUSCH}-1} M_{sc}^{UCI}(l)}{\sum_{r=0}^{C_{UL-SCH}-1} K_r},$$

the $C_{UL-SCH}$, the $K_r$, the $N_{symb,all}^{PUSCH}$ and the $M_{sc}^{UCI}(l)$ are described in section 6.3.2.4 of 3GPP TS 38.212.

In one embodiment, the given first-type reference value is equal to $$\frac{M_{SC}^{PUSCH-initial(x)} N_{symb}^{PUSCH-initial(x)}}{\sum_{r=0}^{C^{(x)}-1} K_r^{(x)}},$$

the x is an index of a TB block corresponding to the largest $I_{MCS}$ in the TB blocks carried by the PUSCH, the $C^{(x)}$ is a number of code blocks included in the TB block with an index of x, the $K_r^{(x)}$ is a number of bits included in the r-th code block of the TB block with an index of x, the $M_{sc}^{PUSCH-initial(x)}$ is a number of multicarrier symbols occupied by the TB block during the first transmission with an index of x, and the $N_{symb}^{PUSCH-initial(x)}$ is the bandwidth occupied by the TB block during the first transmission with an index of x. The specific definitions of the $$\frac{M_{SC}^{PUSCH-initial(x)} N_{symb}^{PUSCH-initial(x)}}{\sum_{r=0}^{C^{(x)}-1} K_r^{(x)}},$$

the x, the $C^{(x)}$, the $K_r^{(x)}$, the $M_{sc}^{PUSCH-initial(x)}$ and the $N_{symb}^{PUSCH-initial(x)}$ are described in section 5.2.2 of 3GPP TS 36.212.

Embodiment 20

Figure 20:
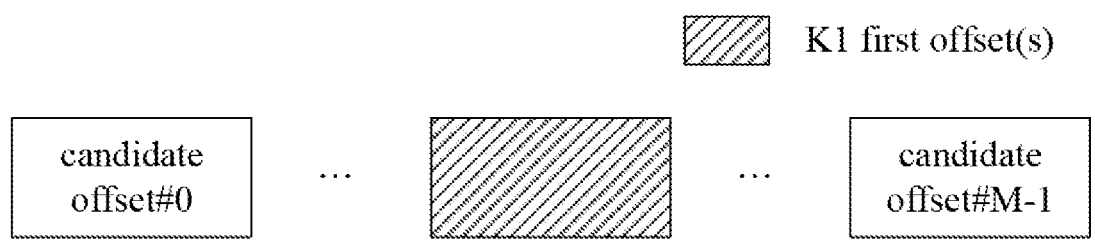
FIG. 20 is a schematic diagram illustrating K1 first offset(s) and M candidate offsets according to one embodiment of the disclosure.

Embodiment 20 illustrates a schematic diagram of K1 first offset(s) and M candidate offsets; as shown in FIG. 20.

In Embodiment 20, the first information in the disclosure indicates the M candidate offsets, and any one of the K1 first offset(s) is one of the M candidate offsets. In FIG. 20, the indices of the M candidate offsets are #{0, . . . , M-1}, respectively, and the box filled with left slashes represents the first offset of the K1 first offset(s).

In one embodiment, any one of the M candidate offsets is a positive real number.

In one embodiment, any one of the M candidate offsets is a positive real number not less than one.

In one embodiment, the K1 is used to determine the K1 first offset(s) from the M candidate offsets.

In one embodiment, M-1 thresholds are arranged in an ascending order; for any given first offset of the K1 first offset(s), if the first offset is greater than the threshold #i-1 of the M-1 thresholds but not greater than the threshold #i of the M-1 thresholds, the given first offset is equal to the candidate offset #1 of the M candidate offsets, the i is a positive integer less than the M-1; if the K1 is not greater than the threshold #0 of the M-1 thresholds, the given first offset is equal to the candidate offset #0 of the M candidate offsets; if the K1 is greater than the threshold #M-2 of the M-1 thresholds, the given first offset is equal to the candidate offset #M-1 of the M candidate offsets.

In one sub-embodiment of the above embodiment, the indexes of the M-1 thresholds are #{0, . . . , M-2}, respectively.

In one sub-embodiment of the above embodiment, the K1 first offset(s) are all equal.

In one sub-embodiment of the above embodiment, the M-1 thresholds are configured by a higher layer signaling.

In one sub-embodiment of the above embodiment, the M-1 thresholds are configured by an RRC signaling.

In one sub-embodiment of the above embodiment, the first information indicates the M-1 thresholds.

In one sub-embodiment of the above embodiment, the second information in the disclosure indicates the M-1 thresholds.

In one sub-embodiment of the above embodiment, the first signaling in the disclosure indicates the M-1 thresholds.

In one embodiment, the M candidate offsets are divided into K1 candidate offset group(s), any candidate offset of the K1 candidate offset group(s) comprises a positive integer number of candidate offsets of the M candidate offsets; and the K1 first offset(s) form one candidate offset of the K1 candidate offset group(s), respectively.

In one sub-embodiment of the above embodiment, one of the M candidate offsets does not belong to two of the K1 candidate offset group(s).

In one sub-embodiment of the above embodiment, any one of the M candidate offsets belongs to one of the K1 candidate offset group(s).

In one sub-embodiment of the above embodiment, the first information comprises K1 first sub-information, and the K1 first sub-information indicates the K1 candidate offset group(s), respectively.

In one sub-embodiment of the above embodiment, the K1 first sub-information is carried by a higher layer signaling, respectively.

In one sub-embodiment of the above embodiment, the K1 first sub-information is respectively carried by an RRC signaling, respectively.

In one sub-embodiment of the above embodiment, the K1 first sub-information comprises all or part of the information in K1 Information Element(s) (IEs), respectively.

In one sub-embodiment of the above embodiment, the K1 is used to determine a corresponding first offset from each of the K1 candidate offset group(s).

In one sub-embodiment of the above embodiment, for any given candidate offset group of the K1 candidate offset group(s), the given candidate offset group corresponds to the given first offset of the K1 first offset(s); the given candidate offset group comprises M1 candidate offsets of the M candidate offsets, and the M1 is a positive integer less than the M. The M1-1 thresholds are sequentially arranged in an ascending order; if the K1 is greater than the threshold #i-1 of the M1-1 thresholds but not greater than the threshold #i of the M1-1 thresholds, the given first offset is equal to the candidate offset #i of the M1 candidate offsets, the i is a positive integer less than the M1-1; if the K1 is not greater than the threshold #0 of the M1-1 thresholds, the given first offset is equal to the candidate offset #0 of the M1 candidate offsets; if the K1 is greater than the threshold #M1-2 of the M1-1 thresholds, the given first offset is equal to the candidate offset #M1-1 of the M1 candidate offsets.

In one reference embodiment of the above sub-embodiment, the M1-1 thresholds are configured by a higher layer signaling.

In one reference embodiment of the above sub-embodiment, the M1-1 thresholds are configured by an RRC signaling.

Embodiment 21

Figure 21:
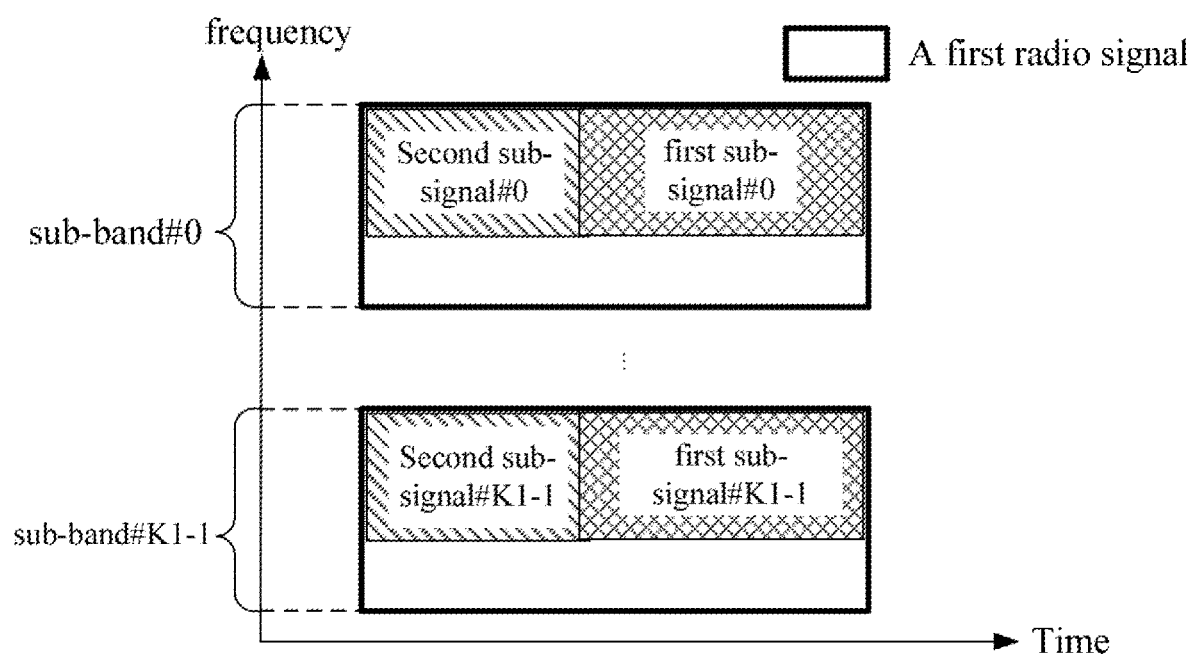
FIG. 21 is a schematic diagram illustrating a first radio signal and K1 second sub-signal(s) according to one embodiment of the disclosure.

Embodiment 21 illustrates a schematic diagram of a first radio signal and K1 second sub-signal(s); as shown in FIG. 21.

In Embodiment 21, the first radio signal comprises the K1 second sub-signal(s), the K1 second sub-signal(s) are transmitted in the K1 sub-band(s) in the disclosure, respectively; each of the K1 second sub-signal(s) carries the second bit block in the disclosure, the second bit block comprises a positive integer number of bits; the second bit block is used to determine the number of REs occupied by any of the K1 first sub-signal(s) in the disclosure in the time-frequency domain. In FIG. 21, the indices of the K1 second sub-signal(s), the K1 first sub-signal(s) and the K1 sub-band(s) are #{0, . . . , K1-1}, respectively.

In one embodiment, the second bit block carries uplink control information.

In one embodiment, the second bit block carries a UCI.

In one embodiment, the second bit block carries an AUL-UCI.

In one embodiment, the second bit block indicates a number of REs occupied by any one of the K1 first sub-signal(s) in the time-frequency domain.

In one embodiment, the second bit block explicitly indicates a number of REs occupied by any one of the K1 first sub-signal(s) in the time-frequency domain.

In one embodiment, the second bit block implicitly indicates a number of REs occupied by any one of the K1 first sub-signal(s) in the time-frequency domain.

In one embodiment, the second bit block is used to determine the K1.

In one embodiment, the second bit block indicates the K1.

In one embodiment, the second bit block explicitly indicates the K1.

In one embodiment, the second bit block implicitly indicates the K1.

In one embodiment, the second bit block is used to determine the K1 sub-band(s).

In one embodiment, the second bit block indicates the K1 sub-band(s).

In one embodiment, the second bit block explicitly indicates the K1 sub-band(s).

In one embodiment, the second bit block implicitly indicates the K1 sub-band(s).

In one embodiment, a number of bits included in the second bit block is uncorrelated with the K1.

In one embodiment, a number of REs occupied by any one of the K1 second sub-signal(s) in the time-frequency domain is uncorrelated with the K1.

In one embodiment, for any given second sub-signal of the K1 second sub-signal(s), the given second sub-signal is transmitted in a given sub-band of the K1 sub-band(s). The REs occupied by the given second sub-signal in the given sub-band constitute(s) a first RE set; the REs occupied by the first radio signal in the given sub-band constitute(s) a second RE set; and the location of the first RE set in the second RE set is determined by default.

In one sub-embodiment of the above embodiment, the first RE set and the second RE set comprise a positive integer number of REs, respectively.

In one sub-embodiment of the above embodiment, the first RE set is a subset of the second RE set.

In one sub-embodiment of the above embodiment, the location of the first RE set in the second RE set is determined by default, indicating that: the location of the first RE set in the second RE set does not need to be configured by a downlink signaling.

In one sub-embodiment of the above embodiment, the location of the first RE set in the second RE set is determined by default, indicating that: the location of the first RE set in the second RE set does not need to be explicitly configured by a downlink signaling.

In one sub-embodiment of the above embodiment, the location of the first RE set in the second RE set is determined by default, indicating that: the location of the first RE set in the second RE set is fixed.

In one sub-embodiment of the above embodiment, the location of the first RE set in the second RE set is determined by default, indicating that: the location of the first RE set in the second RE set is fixed for the second RE set with a given number of REs.

In one embodiment, each of the K1 second sub-signal(s) carries the second bit block, indicating that all the K1 second sub-signal(s) are output after all or a part of bits in the second bit block are sequentially subjected to CRC attachment, segmentation, encoding block-level CRC attachment, channel coding, rate matching, concatenation, scrambling, a modulation mapper, a layer mapper, a transform precoder, precoding, a resource element mapper, multicarrier symbol generation, modulation and upconversion.

In one embodiment, each of the K1 second sub-signal(s) carries the second bit block, indicating that all the K1 second sub-signal(s) are output after all or a part of bits in the second bit block are sequentially subjected to CRC attachment, segmentation, encoding block-level CRC attachment, channel coding, rate matching, concatenation, scrambling, a modulation mapper, a layer mapper, precoding, a resource element mapper, multicarrier symbol generation, modulation and upconversion.

In one embodiment, each of the K1 second sub-signal(s) carries the second bit block, indicating that all the K1 second sub-signal(s) are output after all or a part of bits in the second bit block are sequentially subjected to channel coding, rate matching, a modulation mapper, a layer mapper, a transform precoder, precoding, a resource element mapper, multicarrier symbol generation, modulation and upconversion.

In one embodiment, each of the K1 second sub-signal(s) carries the second bit block, indicating that all the K1 second sub-signal(s) are output after all or a part of bits in the second bit block are sequentially subjected to channel coding, rate matching, a modulation mapper, a layer mapper, precoding, a resource element mapper, multicarrier symbol generation, modulation and upconversion.

In one embodiment, each of the K1 second sub-signal(s) carries the second bit block, indicating that the second bit block is used to generate each of the K1 second sub-signal(s).

In one embodiment, the second bit block and the first bit block in the disclosure belong to two independent channel coding inputs, respectively.

In one embodiment, the channel coding rate corresponding to the second bit block is not higher than the channel coding rate corresponding to the first bit block in the disclosure.

In one sub-embodiment of the above embodiment, the channel coding rate corresponding to the second bit block is lower than the channel coding rate corresponding to the first bit block.

In one sub-embodiment of the above embodiment, the channel coding rate corresponding to the second bit block is equal to the channel coding rate corresponding to the first bit block.

In one embodiment, the modulation order corresponding to the second bit block is not higher than the modulation order corresponding to the first bit block in the disclosure.

In one sub-embodiment of the above embodiment, the modulation order corresponding to the second bit block is lower than the modulation order corresponding to the first bit block.

In one sub-embodiment of the above embodiment, the modulation order corresponding to the second bit block is equal to the modulation order corresponding to the first bit block.

In one embodiment, the reliability of the modulation mode corresponding to the second bit block is not lower than the reliability of the modulation mode corresponding to the first bit block in the disclosure.

In one sub-embodiment of the above embodiment, the reliability of the modulation mode corresponding to the second bit block is higher than the reliability of the modulation mode corresponding to the first bit block.

In one sub-embodiment of the above embodiment, the reliability of the modulation mode corresponding to the second bit block is equal to the reliability of the modulation mode corresponding to the first bit block.

In one embodiment, for any given second sub-signal of the K1 second sub-signal(s), a number of REs occupied by the given second sub-signal in the time-frequency domain is correlated with a number of REs occupied by the first radio signal in the sub-band corresponding to the given second sub-signal.

In one embodiment, a number of REs occupied by any one of the K1 second sub-signal(s) in the time-frequency domain is correlated with a number of bits included in the second bit block.

In one embodiment, the first radio signal carries a third bit block, and the third bit block comprises a TB. A number of REs occupied by any one of the K1 second sub-signal(s) in the time-frequency domain is correlated with a number of bits included in the third bit block.

In one embodiment, K1 second-type value(s) is(are) used to determine a number(numbers) of REs occupied by the K1 second sub-signal(s) in the time-frequency domain, respectively, the K1 second-type value(s) are linearly correlated with K1 second offset(s), respectively, and any one of the K1 second offset(s) is uncorrelated with the K1.

In one sub-embodiment of the above embodiment, any one of the K1 second offset(s) is $\beta_{offset}^{AUL-UCI}$.

In one sub-embodiment of the above embodiment, at least one of the K1 second offset(s) is $\beta_{offset}^{AUL-UCI}$.

In one sub-embodiment of the above embodiment, any one of the K1 second offset(s) is one of $\beta_{offset}^{HARQ-ACK}$, $\beta_{offset}^{CSI-part1}$ and $\beta_{offset}^{CSI-part2}$.

In one sub-embodiment of the above embodiment, at least one of the K1 second offset(s) is one of $\beta_{offset}^{HARQ-ACK}$, $\beta_{offset}^{CSI-part1}$ and $\beta_{offset}^{CSI-part2}$.

In one sub-embodiment of the above embodiment, the K1 second-type value(s) and the K1 second-type reference value(s) are in one-to-one correspondence, and any one of the K1 second-type value(s) is equal to a product of a corresponding second-type reference value and a corresponding second offset.

In one reference embodiment of the above sub-embodiment, the first radio signal carries a third bit block, and the third bit block comprises a TB. The K1 second-type reference value(s) is(are) correlated with a number of REs occupied by the first radio signal in the K1 sub-band(s) and a number of bits in the third bit block, respectively.

In one embodiment, the first radio signal comprises K1 third sub-signal(s), and the K1 third sub-signal(s) are transmitted in the K1 sub-band(s), respectively; each of the K1 third sub-signal(s) carries a third bit block, and the third bit block comprises a TB.

In one sub-embodiment of the above embodiment, the third bit block comprises a positive integer number of bits.

In one sub-embodiment of the above embodiment, the third bit block comprises data.

In one sub-embodiment of the above embodiment, the third bit block is a TB.

In one sub-embodiment of the above embodiment, the third bit block comprises a third information bit block and a third parity bit block, and the third parity bit block is generated by Cyclic Redundancy Check (CRC) of the third information bit block.

In one sub-embodiment of the above embodiment, the first radio signal is the first transmission of the third bit block.

In one sub-embodiment of the above embodiment, the first radio signal is a retransmission of the third bit block.

In one embodiment, the first radio signal comprises the K1 first sub-signal(s), the K1 second sub-signal(s), and the K1 third sub-signal(s) in Embodiment 21.

Embodiment 22

Figure 22:
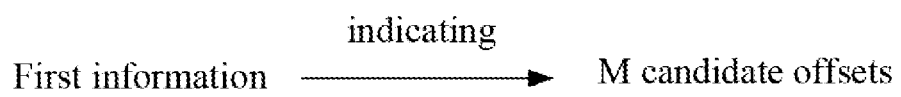
FIG. 22 is a schematic diagram illustrating first information according to one embodiment of the disclosure.

Embodiment 22 illustrates a schematic diagram of the first information; as shown in FIG. 22.

In Embodiment 22, the first information indicates M candidate offsets in the disclosure, and any one of the K1 first offset(s) in the disclosure is the one of the M candidate offsets.

In one embodiment, the first information is carried by a higher layer signaling.

In one embodiment, the first information is carried by an RRC signaling.

In one embodiment, the first information is carried by a physical layer signaling.

In one embodiment, the first information is an IE.

In one embodiment, the first information comprises an IE.

In one embodiment, the first information comprises all or part of the information in an IE.

In one embodiment, the first information comprises a plurality of IEs.

In one embodiment, the first information comprises all or part of the information of the plurality of IEs.

In one embodiment, the first information is a field in an IE.

In one embodiment, the first information comprises all or part of the information in one field in an IE.

In one embodiment, the first information comprises all or part of the information in a plurality of fields in the plurality of IEs.

In one embodiment, the first information comprises all or part of the information in the PUSCH-Config IE.

In one embodiment, the first information is a uci-On PUSCH field in the PUSCH-Config IE.

In one embodiment, the first information comprises all or part of the information in a uci-On PUSCH field in the PUSCH-Config IE.

In one embodiment, the specific definition of the PUSCH-Config IE is described in 3GPP TS 38.311 or 3GPP TS 36.311 (V15.3.0).

In one embodiment, the first information comprises all or part of the information in the ConfiguredGrantConfig IE.

In one embodiment, the first information is a uci-On PUSCH field in the ConfiguredGrantConfig IE.

In one embodiment, the first information comprises all or part of the information in a uci-On PUSCH field in the ConfiguredGrantConfig IE.

In one embodiment, the specific definition of the ConfiguredGrantConfig IE is described in 3GPP TS 38.311.

In one embodiment, the specific definition of the uci-On PUSCH domain is described in 3GPP TS 38.311.

In one embodiment, the first information is UCI-On-PUSCH.

In one embodiment, the first information comprises all or part of the information in the UCI-OnPUSCH.

In one embodiment, the first information is CG-UCI-OnPUSCH.

In one embodiment, the first information comprises all or part of the information in the CG-UCI-OnPUSCH.

In one embodiment, the specific definition of UCI-On-PUSCH is described in 3GPP TS 38.311.

In one embodiment, the specific definition of CG-UCI-OnPUSCH is described in 3GPP TS 38.311.

In one embodiment, the first information is transmitted in one or more of the K sub-bands in the disclosure.

In one embodiment, the first information is transmitted in sub-bands other than the K sub-bands in the disclosure.

In one embodiment, the first information is transmitted on a frequency band deployed in an unlicensed spectrum.

In one embodiment, the first information is transmitted on a frequency band deployed in a licensed spectrum.

Embodiment 23

Figure 23:
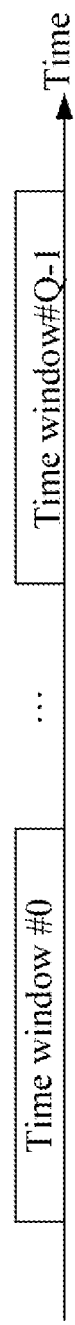
FIG. 23 is a schematic diagram illustrating Q time windows according to one embodiment of the disclosure.

Embodiment 23 illustrates a schematic diagram of Q time windows; as shown in FIG. 23.

In the embodiment 23, the second information in the disclosure is used to determine the Q time windows, and a time domain resource occupied by the first radio signal in the disclosure belongs to a first time window of the Q time windows. In FIG. 23, the indexes of the Q time windows are #{0, . . . , Q-1}, respectively.

In one embodiment, the second information indicates the Q time windows.

In one embodiment, the second information explicitly indicates the Q time windows.

In one embodiment, the second information and the first signaling in the disclosure jointly indicate the Q time windows.

In one embodiment, the first time window is one of the Q time windows.

In one embodiment, any two of the Q time windows are orthogonal to each other (non-overlapping).

In one embodiment, the Q time windows are non-consecutive in the time domain.

In one embodiment, at least two of the Q time windows are consecutive in the time domain.

In one embodiment, any two of the Q time windows have the same length.

In one embodiment, at least two of the Q time windows have different lengths.

In one embodiment, the Q time windows appear at equal intervals in the time domain.

In one embodiment, the Q time windows appear at unequal intervals in the time domain.

In one embodiment, any one of the Q time windows is a consecutive duration.

In one embodiment, any one of the Q time windows is a slot.

In one embodiment, any one of the Q time windows is a sub-frame.

In one embodiment, any one of the Q time windows comprises a positive integer number of multicarrier symbols.

In one embodiment, any one of the Q time windows comprises a positive integer number of consecutive multicarrier symbols.

In one embodiment, any one of the Q time windows comprises a positive integer number of slots.

In one embodiment, any one of the Q time windows comprises a positive integer number of consecutive slots.

In one embodiment, any one of the Q time windows comprises a positive integer number of sub-frames.

In one embodiment, any one of the Q time windows comprises a positive integer number of consecutive sub-frames.

In one embodiment, all the Q time windows belong to the time domain resource(s) allocated to an uplink transmission based on an AUL.

In one embodiment, all the Q time windows belong to the time domain resource(s) allocated to an uplink transmission based on a configured grant.

Embodiment 24

Figure 24:
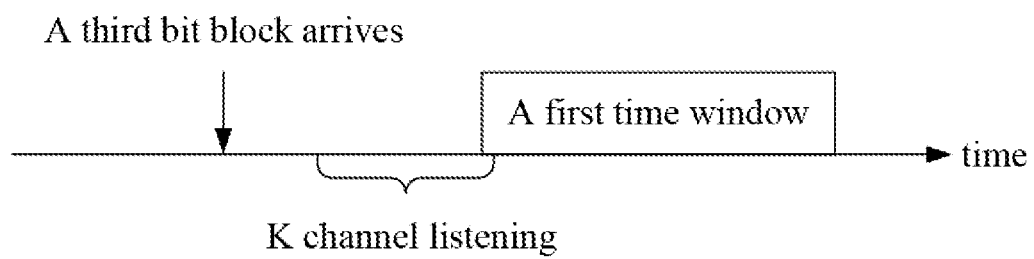
FIG. 24 is a schematic diagram illustrating a user equipment selecting a first time window from Q time windows voluntarily according to one embodiment of the disclosure.

Embodiment 24 illustrates a schematic diagram of a user equipment selecting a first time window from Q time windows voluntarily; as shown in FIG. 24.

In Embodiment 24, the first radio signal in the disclosure is transmitted within the first time window. The first radio signal carries a third bit block, and the third bit block comprises a TB. The start time of the first time window is later than the arrival time of the third bit block. The behavior of the K channel listening in the disclosure is used to select the first time window from the Q time windows voluntarily.

In one embodiment, the first radio signal occupies a first multicarrier symbol in the first time window.

In one embodiment, the first radio signal does not occupy the first multicarrier symbol in the first time window.

In one embodiment, the first radio signal occupies a last multicarrier symbol in the first time window.

In one embodiment, the first radio signal does not occupy a last multicarrier symbol in the first time window.

In one embodiment, the start time of the first time window is later than the time when the third bit block arrives at the physical layer of the user equipment.

In one embodiment, the first time window is the earliest time window in which the start time of the Q time windows is later than the arrival time of the third bit block and it is determined according to the K channel listening that at least one of the K sub-bands in the disclosure is idle.

In one embodiment, the behavior of the K channel listening is used by the user equipment to select the first time window from the Q time windows voluntarily.

In one embodiment, any one of the K1 sub-band(s) in the disclosure is determined to be idle in the first time window by the corresponding channel listening in the K channel listening.

In one embodiment, any one of the K1 sub-band(s) in the disclosure is determined by the corresponding channel listening in the K channel listening to be used to transmit a radio signal in the first time window.

In one embodiment, any one of the K1 sub-band(s) in the disclosure is determined by the corresponding channel listening in the K channel listening to be used by the user equipment to transmit a radio signal in the first time window.

In one embodiment, any one of the K1 sub-band(s) in the disclosure is determined by the corresponding channel listening in the K channel listening to be used to transmit a radio signal in the first time window.

In one embodiment, any one of the K sub-bands in the disclosure that does not belong to the K1 sub-band(s) is determined to be not idle in the first time window by the corresponding channel listening in the K channel listening.

In one embodiment, at least one of the K sub-bands in the disclosure that does not belong to the K1 sub-band(s) is determined to be idle in the first time window by the corresponding channel listening in the K channel listening.

In one embodiment, the user equipment does not transmit a radio signal in any one of the K sub-bands in the disclosure that does not belong to the K1 sub-band(s) in the first time window.

In one embodiment, the first radio signal occupies all the time domain resources in the first time window.

In one embodiment, the first radio signal only occupies a part of the time domain resources in the first time window.

Embodiment 25

Figure 25:
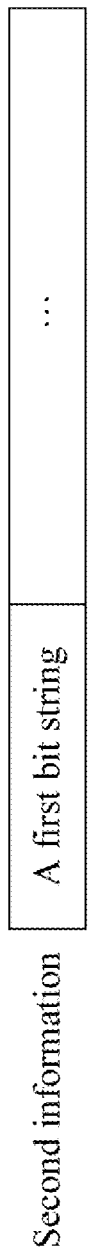
FIG. 25 is a schematic diagram illustrating second information according to one embodiment of the disclosure.

Embodiment 25 illustrates a schematic diagram of the second information; as shown in FIG. 25.

In Embodiment 25, the second information comprises a first bit string, the first bit string is consisted of a positive integer number of bits, and the first bit string indicates the Q time windows in the disclosure.

In one embodiment, the second information is carried by a higher layer signaling.

In one embodiment, the second information is carried by an RRC signaling.

In one embodiment, the second information is an IE.

In one embodiment, the second information comprises an IE.

In one embodiment, the second information comprises all or part of the information in an IE.

In one embodiment, the second information comprises all or part of the information in the ConfiguredGrantConfig IE.

In one embodiment, the second information comprises all or part of the information in the SPS-Config IE.

In one embodiment, the specific definition of the SPS-Config IE is described in 3GPP TS 38.311.

In one embodiment, the second information comprises all or part of the information in the AUL-Config IE.

In one embodiment, the specific definition of the AUL-Config IE is described in 3GPP TS 36.311 (V15.3.0).

In one embodiment, the first bit string is indicated by an aul-Subframes-r15 field in the AUL-Config IE.

In one embodiment, the first bit string carries all or part of the information in the aul-Subframes-r15 field in the AUL-Config IE.

In one embodiment, the specific definition of the aul-Subframes-r15 field is described in 3GPP TS 36.311 (V15.3.0).

In one embodiment, the first bit string is consisted of 40 bits.

In one embodiment, the Q time windows form a subset of the Q1 time windows, and the Q1 is a positive integer not less than the Q. The first bit string comprises Q1 bits, and the Q1 bits and the Q1 time windows are in one-to-one correspondence. For any given bit in the first bit string, if the any given bit is equal to a given value, the time window corresponding to the any given bit in the Q1 time windows is one of the Q time windows; otherwise, the time window corresponding to the any given bit in the Q1 time windows is not one of the Q time windows.

In one sub-embodiment of the above embodiment, the given value is equal to 1.

In one sub-embodiment of the above embodiment, the given value is equal to 0.

Embodiment 26

Figure 26:
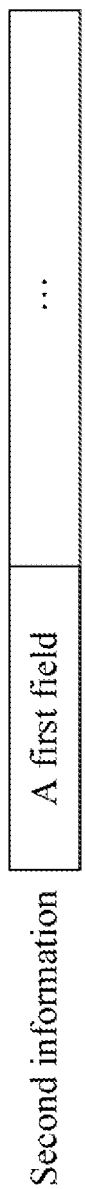
FIG. 26 is a schematic diagram illustrating second information according to one embodiment of the disclosure.

Embodiment 26 illustrates a schematic diagram of the second information; as shown in FIG. 26.

In Embodiment 26, the second information comprises a first field, and the first field in the second information is used to determine Q time windows in the disclosure.

In one embodiment, the first field in the second information indicates the Q time windows.

In one embodiment, the first field in the second information explicitly indicates the Q time windows.

In one embodiment, the first field in the second information implicitly indicates the Q time windows.

In one embodiment, the first field in the second information comprises all or part of the information in a periodicity field in the ConfiguredGrantConfig IE.

In one embodiment, the first field in the second information comprises all or part of the information in a timeDomainOffset field in the ConfiguredGrantConfig IE.

In one embodiment, the first field in the second information comprises all or part of the information in a timeDomainAllocation field in the ConfiguredGrantConfig IE.

In one embodiment, the first field in the second information comprises all or part of the information in a periodicity field in the SPS-Config IE.

In one embodiment, the specific definition of the periodicity field is described in 3GPP TS 38.311.

In one embodiment, the specific definition of the timeDomainOffset field is described in 3GPP TS 38.311.

In one embodiment, the specific definition of the timeDomainAllocation field is described in 3GPP TS38.311.

Embodiment 27

Figure 27:
FIG. 27 is a schematic diagram illustrating a first signaling according to one embodiment of the disclosure.

Embodiment 27 illustrates a schematic diagram of the first signaling; as shown in FIG. 27.

In Embodiment 27, the first signaling comprises a second field, and the second field in the first signaling indicates a frequency domain resource occupied by the first radio signal in the disclosure.

In one embodiment, the first signaling explicitly indicates the frequency resource(s) occupied by the first radio signal.

In one embodiment, the first signaling implicitly indicates the frequency resource(s) occupied by the first radio signal.

In one embodiment, the first signaling is physical layer signaling.

In one embodiment, the first signaling is dynamic signaling.

In one embodiment, the first signaling is a L1 signaling.

In one embodiment, the first signaling is a control signaling of L1.

In one embodiment, the first signaling comprises Downlink Control Information (DCI).

In one embodiment, the first signaling is UE specific.

In one embodiment, the first signaling is common to a cell.

In one embodiment, the first signaling is terminal group specific, wherein the terminal group comprises a positive integer number of terminals, and the user equipment in the disclosure is one terminal in the terminal group.

In one embodiment, the signaling identifier of the first signaling is a Configured Scheduling (CS)-Radio Network Temporary Identifier (RNTI).

In one embodiment, the first signaling comprises a DCI in which the CRC is scrambled by the CS-RNTI.

In one embodiment, the signaling identifier of the first signaling is a Semi-Persistent Scheduling (SPS)-Cell (C)-RNTI.

In one embodiment, the first signaling comprises a DCI in which the CRC is scrambled by the SPS-C-RNTI.

In one embodiment, the signaling identifier of the first signaling is an AUL C-RNTI.

In one embodiment, the first signaling comprises a DCI in which the CRC is scrambled by the AUL C-RNTI.

In one embodiment, the first signaling is used for AUL activation.

In one embodiment, the first signaling is used to activate an uplink transmission of a configured grant based on a Type 2.

In one embodiment, the first signaling is used to activate the Q time windows in the disclosure.

In one embodiment, the HARQ process number field in the first signaling is set to all zeros.

In one embodiment, the Redundancy version field in the first signaling is set to all zeros.

In one embodiment, the first signaling comprises a dynamic signaling for an uplink grant.

In one embodiment, the first signaling is a dynamic signaling for an uplink grant.

In one embodiment, the signaling identifier of the first signaling is a C-RNTI.

In one embodiment, the first signaling comprises a DCI in which the CRC is scrambled by the C-RNTI.

In one embodiment, the first signaling indicates scheduling information of the first radio signal.

In one embodiment, the scheduling information of the first radio signal comprises at least one of {occupied time domain resource(s), an occupied frequency domain resource, a Modulation and Coding Scheme (MCS), configuration information of the DMRS, a HARQ process number, an RV, an NDI}.

In one embodiment, the configuration information of the DMRS comprises one or more of {occupied time domain resource(s), an occupied frequency domain resource, occupied code domain resource(s), an RS sequence, a mapping mode, an DMRS type, a cyclic shift, an Orthogonal Cover Code (OCC)}.

In one embodiment, the HARQ process number field in the first signaling is not all zeros.

In one embodiment, the redundancy version field in the first signaling is not all zeros.

In one embodiment, the second field in the first signaling comprises all or part of the information in a frequency domain resource assignment field.

In one embodiment, the second field in the first signaling comprises all or part of the information in a carrier indicator field.

In one embodiment, the second field in the first signaling comprises all or part of the information in a bandwidth part indicator field.

In one embodiment, the specific definition of the frequency domain resource assignment field is described in 3GPP TS 38.212.

In one embodiment, the specific definition of the carrier indicator field is described in 3GPP TS 38.212.

In one embodiment, the specific definition of the bandwidth part indicator field is described in 3GPP TS 38.212.

In one embodiment, the first signaling is transmitted in one or more of the K sub-bands in the disclosure.

In one embodiment, the first signaling is transmitted in sub-bands other than the K sub-bands in the disclosure.

In one embodiment, the first signaling is transmitted on a frequency band deployed in an unlicensed spectrum.

In one embodiment, the first signaling is transmitted on a frequency band deployed in a licensed spectrum.

Embodiment 28

Figure 28:
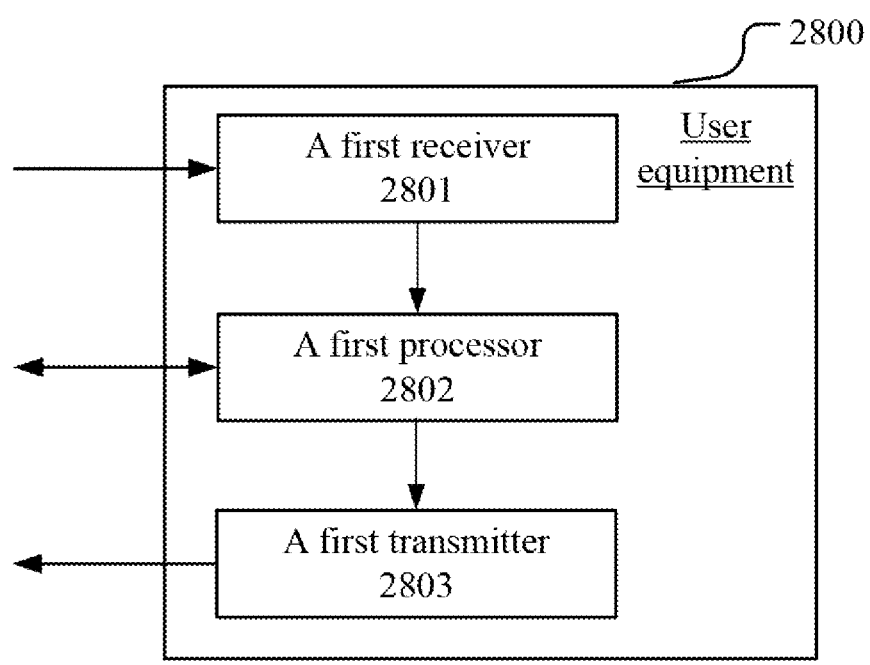
FIG. 28 is a block diagram illustrating the structure of a processing device in a user equipment according to one embodiment of the disclosure.

Embodiment 28 is a block diagram illustrating the structure of a processing device in a user equipment; as shown in FIG. 28. In FIG. 28, the processing device 2800 in the user equipment is mainly consisted of a first receiver 2801, a first processor 2802, and a first transmitter 2803.

In Embodiment 28, the first receiver 2801 performs K channel listening in K sub-bands, respectively; the first processor 2802 determines that a first radio signal can only be transmitted in K1 sub-band(s) out of the K sub-bands; and the first transmitter 2803 transmits the first radio signal in the K1 sub-band(s).

In Embodiment 28, the K channel listening is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

In one embodiment, K1 first-type value(s) is(are) used to determine a number(numbers) of REs occupied by the K1 first sub-signal(s) in the time-frequency domain, respectively, the K1 first-type value(s) is(are) linearly correlated with K1 first offset(s), respectively, and any one of the K1 first offset(s) is correlated with the K1.

In one embodiment, the K1 first-type value(s) and K1 first-type reference value(s) are in one-to-one correspondence, and any one of the K1 first-type value(s) is equal to a product of a corresponding first-type reference value and a corresponding first offset.

In one embodiment, the first receiver 2801 receives first information, wherein the first information indicates M candidate offsets, any one of the K1 first offset(s) is one of the M candidate offsets, and the M is a positive integer greater than 1.

In one embodiment, a number of bits included in the first bit block is uncorrelated with the K1.

In one embodiment, the first radio signal comprises K1 second sub-signal(s), the K1 second sub-signal(s) is(are) transmitted in the K1 sub-band(s), respectively, each of the K1 second sub-signal(s) carries a second bit block, the second bit block comprises a positive integer number of bits, and the second bit block is used to determine the number of REs occupied by any one of the K1 first sub-signal(s) in the time-frequency domain.

In one embodiment, a number of REs occupied by any one of the K1 second sub-signal(s) in the time-frequency domain is uncorrelated with the K1.

In one embodiment, the first receiver 2801 receives second information, wherein the second information is used to determine Q time windows, a time domain resource occupied by the first radio signal belongs to a first time window of the Q time windows, and the Q is a positive integer number greater than 1.

In one embodiment, the first processor 2802 selects the first time window from the Q time windows voluntarily.

In one embodiment, the first receiver 2801 receives a first signaling, wherein the first signaling indicates a frequency domain resource occupied by the first radio signal.

In one embodiment, the first receiver 2801 comprises at least one of an antenna 452, a receiver 454, a receiving processor 456, a channel decoder 458, a controller/processor 459, a memory 460, and a data source 467 in Embodiment 4.

In one embodiment, the first processor 2802 comprises at least one of an antenna 452, a transmitter/receiver 454, a transmitting processor 468, a receiving processor 456, a channel encoder 457, a channel decoder 458, a controller/processor 459, a memory 460, and a data source 467 in Embodiment 4.

In one embodiment, the first transmitter 2803 comprises at least one of an antenna 452, a transmitter 454, a transmitting processor 468, a channel encoder 457, a controller/processor 459, a memory 460, and a data source 467 in Embodiment 4.

Embodiment 29

Figure 29:
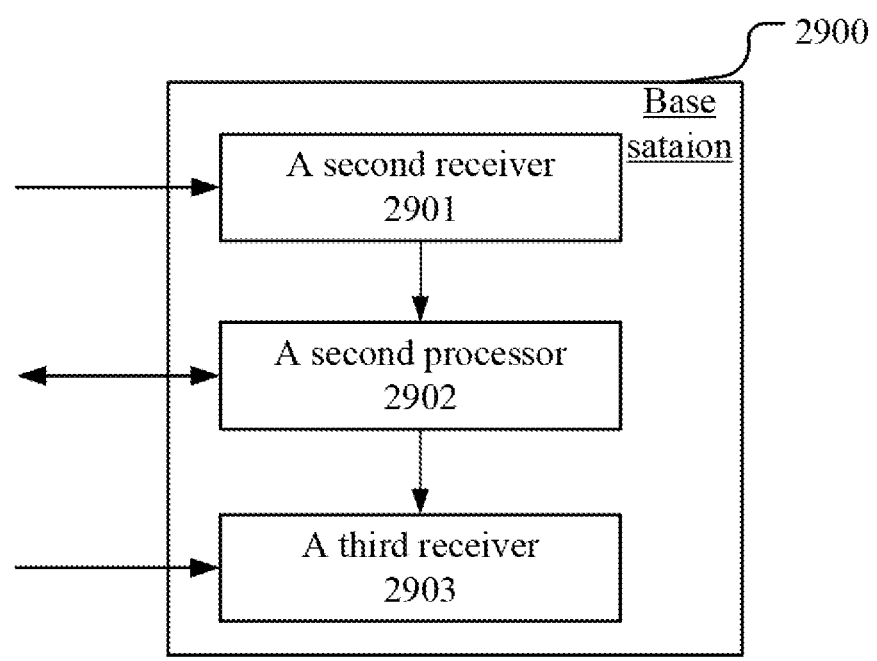
FIG. 29 is a block diagram illustrating the structure of a processing device in a base station according to one embodiment of the disclosure.

Embodiment 29 is a block diagram illustrating the structure of a processing device in a base station; as shown in FIG. 29. In FIG. 29, the processing device 2900 in the base station is mainly consisted of a second receiver 2901, a second processor 2902, and a third receiver 2903.

In Embodiment 29, the second receiver 2901 monitors a first radio signal in K sub-bands; the second processor 2902 determines that only the first radio signal needs to be received in K1 sub-band(s) out of the K sub-bands; the third receiver 2903 receives the first radio signal in the K1 sub-band(s).

In Embodiment 29, the monitoring behavior is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

In one embodiment, K1 first-type value(s) is(are) used to determine a number(numbers) of REs occupied by the K1 first sub-signal(s) in the time-frequency domain, respectively, the K1 first-type value(s) is(are) linearly correlated with K1 first offset(s), respectively, and any one of the K1 first offset(s) is correlated with the K1.

In one embodiment, the K1 first-type value(s) and K1 first-type reference value(s) are in one-to-one correspondence, and any one of the K1 first-type value(s) is equal to a product of a corresponding first-type reference value and a corresponding first offset;

In one embodiment, the second processor 2902 transmits first information, wherein the first information indicates M candidate offsets, any one of the K1 first offset(s) is one of the M candidate offsets, and the M is a positive integer greater than 1.

In one embodiment, a number of bits included in the first bit block is uncorrelated with the K1.

In one embodiment, the first radio signal comprises K1 second sub-signal(s), the K1 second sub-signal(s) is(are) transmitted in the K1 sub-band(s), respectively, each of the K1 second sub-signal(s) carries a second bit block, the second bit block comprises a positive integer number of bits, and the second bit block is used to determine the number of REs occupied by any one of the K1 first sub-signal(s) in the time-frequency domain.

In one embodiment, a number of REs occupied by any one of the K1 second sub-signal(s) in the time-frequency domain is uncorrelated with the K1.

In one embodiment, the second processor 2902 transmits second information, wherein the second information is used to determine Q time windows, a time domain resource occupied by the first radio signal belongs to a first time window of the Q time windows, and the Q is a positive integer number greater than 1.

In one embodiment, the monitoring behavior is used to determine the first time window from the Q time windows voluntarily.

In one embodiment, the second processor 2902 transmits a first signaling, wherein the first signaling indicates a frequency domain resource occupied by the first radio signal.

In one embodiment, the second receiver 2901 comprises at least one of an antenna 420, a receiver 418, a receiving processor 470, a channel decoder 478, a controller/processor 475, and a memory 476 in Embodiment 4.

In one embodiment, the second processor 2902 comprises at least one of an antenna 420, a transmitter/receiver 418, a transmitting processor 416, a receiving processor 470, a channel encoder 477, a channel decoder 478, a controller/processor 475, and a memory 476 in Embodiment 4.

In one embodiment, the third receiver 2903 comprises at least one of an antenna 420, a receiver 418, a receiving processor 470, a channel decoder 478, a controller/processor 475, and a memory 476 in Embodiment 4.

One of ordinary skill in the art can appreciate that all or part of the above steps can be completed by a program to instruct related hardware. The program can be stored in a computer-readable storage medium such as a read only memory, a hard disk or an optical disk. Alternatively, all or part of the steps of the above embodiments may also be implemented using one or more integrated circuits. Correspondingly, each module unit in the above embodiment may be implemented in hardware form or in the form of a software function module. The disclosure is not limited to any specific combination of software and hardware. The user equipment, terminal and UE in the disclosure include, but are not limited to, a wireless communication device such as a drone, a communication module on the drone, a remote control aircraft, an aircraft, a small aircraft, a mobile phone, a tablet computer, a notebook, a vehicle communication device, a wireless sensor, an internet card, an Internet of Things terminal, an RFID terminal, an NB-IOT terminal, a Machine Type Communication (MTC) terminal, an enhanced MTC (eMTC) terminal, a data card, an internet card, a vehicle communication device, a low-cost mobile phone, a low-cost tablet computer, etc. The base station or system device in the disclosure includes, but is not limited to, a macro communication base station, a micro cell base station, a home base station, a relay base station, an NR Node B (gNB), a Transmitter Receiver Point (TRP), and other wireless communication devices.

The above is only the preferred embodiment of the disclosure and is not intended to limit the scope of protection the disclosure. Any modifications, equivalents, improvements, etc., which are made within the spirit and principle of the disclosure, are intended to be included within the scope of protection the disclosure.

What is claimed is:

1. A method in a user equipment for wireless communication, comprising:
   performing K channel listening in K sub-bands, respectively;
   determining that a first radio signal can only be transmitted in K1 sub-band(s) out of the K sub-bands; and
   transmitting the first radio signal in the K1 sub-band(s),
   wherein the K channel listening is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K; K1 first-type value(s) is(are) used to determine a number(numbers) of REs occupied by the K1 first sub-signal(s) in the time-frequency domain, respectively, the K1 first-type value(s) is(are) linearly correlated with K1 first offset(s), respectively, and any one of the K1 first offset(s) is correlated with the K1;
   any one of the K1 first offset(s) is one of M candidate offsets with M being a positive integer greater than 1, or,
   the K1 first-type value(s) and K1 first-type reference value(s) are in one-to-one correspondence and any one of the K1 first-type value(s) is equal to a product of a corresponding first-type reference value and a corresponding first offset.

2. The method according to claim 1,
   comprising:
   receiving first information,
   wherein the first information indicates the M candidate offsets.

3. The method according to claim 1, wherein a number of bits included in the first bit block is uncorrelated with the K1;
   or, the method comprises:
   receiving a first signaling, wherein the first signaling indicates a frequency domain resource occupied by the first radio signal.

4. The method according to claim 1, wherein the first radio signal comprises K1 second sub-signal(s), the K1 second sub-signal(s) is(are) transmitted in the K1 sub-band(s), respectively, each of the K1 second sub-signal(s) carries a second bit block, the second bit block comprises a positive integer number of bits, and the second bit block is used to determine the number of REs occupied by any one of the K1 first sub-signal(s) in the time-frequency domain;
   or the first radio signal comprises K1 second sub-signal(s), the K1 second sub-signal(s) is(are) transmitted in the K1 sub-band(s), respectively, each of the K1 second sub-signal(s) carries a second bit block, the second bit block comprises a positive integer number of bits, the second bit block is used to determine the number of REs occupied by any one of the K1 first sub-signal(s) in the time-frequency domain, and a number of REs occupied by any one of the K1 second sub-signal(s) in the time-frequency domain is uncorrelated with the K1.

5. The method according to claim 1 comprising:
   receiving second information,
   wherein the second information is used to determine Q time windows, a time domain resource occupied by the first radio signal belongs to a first time window of the Q time windows, and the Q is a positive integer number greater than 1;
   or, comprising:
   receiving second information,
   selecting a first time window from Q time windows voluntarily,
   wherein the second information is used to determine the Q time windows, a time domain resource occupied by the first radio signal belongs to the first time window of the Q time windows, and the Q is a positive integer greater than 1.

6. A method in a base station for wireless communication, comprising:
   monitoring a first radio signal in K sub-bands;
   determining that the first radio signal only needs to be received in K1 sub-band(s) out of the K sub-bands;
   receiving the first radio signal in the K1 sub-band(s);
   wherein the monitoring behavior is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

7. The method according to claim 6, wherein K1 first-type value(s) is(are) used to determine a number(numbers) of REs occupied by the K1 first sub-signal(s) in the time-frequency domain, respectively, the K1 first-type value(s) is(are) linearly correlated with K1 first offset(s), respectively, and any one of the K1 first offset(s) is correlated with the K1;
   or, K1 first-type value(s) is(are) used to determine a number(numbers) of REs occupied by the K1 first sub-signal(s) in the time-frequency domain, respectively, the K1 first-type value(s) is(are) linearly correlated with K1 first offset(s), respectively, any one of the K1 first offset(s) is correlated with the K1, the K1 first-type value(s) and K1 first-type reference value(s) are in one-to-one correspondence, any one of the K1 first-type value(s) is equal to a product of a corresponding first-type reference value and a corresponding first offset;

49 or, the method comprises:
transmitting first information,
wherein K1 first-type value(s) is(are) used to determine a number(numbers) of REs occupied by the K1 first sub-signal(s) in the time-frequency domain, respectively, the K1 first-type value(s) is(are) linearly correlated with K1 first offset(s), respectively, any one of the K1 first offset(s) is correlated with the K1, the first information indicates M candidate offsets, any one of the K1 first offset(s) is one of the M candidate offsets, and the M is a positive integer greater than 1.

8. The method according to claim 6, wherein a number of bits included in the first bit block is uncorrelated with the K1;
or, the method comprises:
transmitting a first signaling,
wherein the first signaling indicates a frequency domain resource occupied by the first radio signal.

9. The method according to claim 6, wherein the first radio signal comprises K1 second sub-signal(s), the K1 second sub-signal(s) is(are) transmitted in the K1 sub-band(s), respectively, each of the K1 second sub-signal(s) carries a second bit block, the second bit block comprises a positive integer number of bits, and the second bit block is used to determine the number of REs occupied by any one of the K1 first sub-signal(s) in the time-frequency domain;
or the first radio signal comprises K1 second sub-signal(s), the K1 second sub-signal(s) is(are) transmitted in the K1 sub-band(s), respectively, each of the K1 second sub-signal(s) carries a second bit block, the second bit block comprises a positive integer number of bits, the second bit block is used to determine the number of REs occupied by any one of the K1 first sub-signal(s) in the time-frequency domain, and a number of REs occupied by any one of the K1 second sub-signal(s) in the time-frequency domain is uncorrelated with the K1.

10. The method according to claim 6, comprising:
transmitting second information,
wherein the second information is used to determine Q time windows, a time domain resource occupied by the first radio signal belongs to a first time window of the Q time windows, and the Q is a positive integer number greater than 1;
or, comprising:
transmitting second information,
wherein the second information is used to determine Q time windows, a time domain resource occupied by the first radio signal belongs to a first time window of the Q time windows, the Q is a positive integer greater than 1, and the monitoring behavior is used to determine the first time window from the Q time windows voluntarily.

11. A user equipment for wireless communication, comprising:
a first receiver performing K channel listening in K sub-bands, respectively;
a first processor determining that a first radio signal can only be transmitted in K1 sub-band(s) out of the K sub-bands; and
a first transmitter transmitting the first radio signal in the K1 sub-band(s),
wherein the K channel listening is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K; K1 first-type value(s) is(are) used to determine a number(numbers) of REs occupied by the K1 first sub-signal(s) in the time-frequency domain, respectively, the K1 first-type value(s) is(are) linearly correlated with K1 first offset(s), respectively, and any one of the K1 first offset(s) is correlated with the K1;
any one of the K1 first offset(s) is one of M candidate offsets with M being a positive integer greater than 1, or,
the K1 first-type value(s) and K1 first-type reference value(s) are in one-to-one correspondence and any one of the K1 first-type value(s) is equal to a product of a corresponding first-type reference value and a corresponding first offset.

12. The user equipment according to claim 11, wherein the first receiver receives first information,
the first information indicates the M candidate offsets.

13. The user equipment according to claim 11, wherein a number of bits included in the first bit block is uncorrelated with the K1;
or, the first receiver receives a first signaling, wherein the first signaling indicates a frequency domain resource occupied by the first radio signal.

14. The user equipment according to claim 11, wherein the first radio signal comprises K1 second sub-signal(s), the K1 second sub-signal(s) is(are) transmitted in the K1 sub-band(s), respectively, each of the K1 second sub-signal(s) carries a second bit block, the second bit block comprises a positive integer number of bits, and the second bit block is used to determine the number of REs occupied by any one of the K1 first sub-signal(s) in the time-frequency domain;
or the first radio signal comprises K1 second sub-signal(s), the K1 second sub-signal(s) is(are) transmitted in the K1 sub-band(s), respectively, each of the K1 second sub-signal(s) carries a second bit block, the second bit block comprises a positive integer number of bits, the second bit block is used to determine the number of REs occupied by any one of the K1 first sub-signal(s) in the time-frequency domain, and a number of REs occupied by any one of the K1 second sub-signal(s) in the time-frequency domain is uncorrelated with the K1.

15. The user equipment according to claim 11, wherein the first receiver receives second information, wherein the second information is used to determine Q time windows, a time domain resource occupied by the first radio signal belongs to a first time window of the Q time windows, and the Q is a positive integer number greater than 1;
or, the first receiver receives second information, and the first processor selects a first time window from Q time windows voluntarily, wherein the second information is used to determine the Q time windows, a time domain resource occupied by the first radio signal belongs to the first time window of the Q time windows, and the Q is a positive integer greater than 1.

16. A base station for wireless communication, comprising:
a second receiver monitoring a first radio signal in K sub-bands;
a second processor determining that the first radio signal only needs to be received in K1 sub-band(s) out of the K sub-bands;
a third receiver receiving the first radio signal in the K1 sub-band(s);

wherein the monitoring behavior is used to determine the K1 sub-band(s) from the K sub-bands; the first radio signal comprises K1 first sub-signal(s), and the K1 first sub-signal(s) is(are) transmitted in the K1 sub-band(s), respectively; each of the K1 first sub-signal(s) carries a first bit block, the first bit block comprises a positive integer number of bits, and a number of REs occupied by any one of the K1 first sub-signal(s) in a time-frequency domain is correlated with the K1; the K is a positive integer greater than 1, and the K1 is a positive integer not greater than the K.

17. The base station according to claim 16, wherein K1 first-type value(s) is(are) used to determine a number(numbers) of REs occupied by the K1 first sub-signal(s) in the time-frequency domain, respectively, the K1 first-type value(s) is(are) linearly correlated with K1 first offset(s), respectively, and any one of the K1 first offset(s) is correlated with the K1;
  or, K1 first-type value(s) is(are) used to determine a number(numbers) of REs occupied by the K1 first sub-signal(s) in the time-frequency domain, respectively, the K1 first-type value(s) is(are) linearly correlated with K1 first offset(s), respectively, any one of the K1 first offset(s) is correlated with the K1, the K1 first-type value(s) and K1 first-type reference value(s) are in one-to-one correspondence, any one of the K1 first-type value(s) is equal to a product of a corresponding first-type reference value and a corresponding first offset;
  or, the second processor transmits first information, wherein K1 first-type value(s) is(are) used to determine a number(numbers) of REs occupied by the K1 first sub-signal(s) in the time-frequency domain, respectively, the K1 first-type value(s) is(are) linearly correlated with K1 first offset(s), respectively, any one of the K1 first offset(s) is correlated with the K1, the first information indicates M candidate offsets, any one of the K1 first offset(s) is one of the M candidate offsets, and the M is a positive integer greater than 1.

18. The base station according to claim 16, wherein a number of bits included in the first bit block is uncorrelated with the K1;
  or, the second processor transmits a first signaling, wherein the first signaling indicates a frequency domain resource occupied by the first radio signal.

19. The base station according to claim 16, wherein the first radio signal comprises K1 second sub-signal(s), the K1 second sub-signal(s) is(are) transmitted in the K1 sub-band(s), respectively, each of the K1 second sub-signal(s) carries a second bit block, the second bit block comprises a positive integer number of bits, and the second bit block is used to determine the number of REs occupied by any one of the K1 first sub-signal(s) in the time-frequency domain;
  or the first radio signal comprises K1 second sub-signal(s), the K1 second sub-signal(s) is(are) transmitted in the K1 sub-band(s), respectively, each of the K1 second sub-signal(s) carries a second bit block, the second bit block comprises a positive integer number of bits, the second bit block is used to determine the number of REs occupied by any one of the K1 first sub-signal(s) in the time-frequency domain, and a number of REs occupied by any one of the K1 second sub-signal(s) in the time-frequency domain is uncorrelated with the K1.

20. The base station according to claim 16, wherein the second processor transmits second information, wherein the second information is used to determine Q time windows, a time domain resource occupied by the first radio signal belongs to a first time window of the Q time windows, and the Q is a positive integer number greater than 1;
  or, the second processor transmits second information, wherein the second information is used to determine Q time windows, a time domain resource occupied by the first radio signal belongs to a first time window of the Q time windows, the Q is a positive integer greater than 1, and the monitoring behavior is used to determine the first time window from the Q time windows voluntarily.

* * * * *